US012786472B2

(12) United States Patent
Chiang et al.

(10) Patent No.: US 12,786,472 B2
(45) Date of Patent: Nov. 3, 2026

(54) SIGNALING FOR TRANSFORM CODING

(71) Applicant: MEDIATEK INC., Hsinchu City (TW)

(72) Inventors: Man-Shu Chiang, Hsinchu City (TW); Chih-Wei Hsu, Hsinchu City (TW); Shih-Ta Hsiang, Hsinchu City (TW); Tzu-Der Chuang, Hsinchu City (TW); Ching-Yeh Chen, Hsinchu City (TW); Chun-Chia Chen, Hsinchu City (TW); Yu-Wen Huang, Hsinchu City (TW)

(73) Assignee: MEDIATEK INC., Hsinchu City (TW)

( * ) Notice: Subject to any disclaimer, the term of this patent is extended or adjusted under 35 U.S.C. 154(b) by 6 days.

(21) Appl. No.: 18/726,994

(22) PCT Filed: Jan. 6, 2023

(86) PCT No.: PCT/CN2023/071016

§ 371 (c)(1),
(2) Date: Jul. 5, 2024

(87) PCT Pub. No.: WO2023/131299

PCT Pub. Date: Jul. 13, 2023

(65) Prior Publication Data

US 2025/0193451 A1 Jun. 12, 2025

Related U.S. Application Data

(60) Provisional application No. 63/297,264, filed on Jan. 7, 2022.

(51) Int. Cl.
*H04N 19/61* (2014.01)
*H04N 19/12* (2014.01)
(Continued)

(52) U.S. Cl.
CPC ............. *H04N 19/61* (2014.11); *H04N 19/12* (2014.11); *H04N 19/157* (2014.11); *H04N 19/176* (2014.11); *H04N 19/196* (2014.11)

(58) Field of Classification Search
CPC ...... H04N 19/12; H04N 19/61; H04N 19/176; H04N 19/196; H04N 19/157
See application file for complete search history.

(56) References Cited

U.S. PATENT DOCUMENTS

2017/0034524 A1 2/2017 Lee
2018/0176582 A1 * 6/2018 Zhao ...................... H04N 19/51
(Continued)

OTHER PUBLICATIONS

International Search Report and Written Opinion dated Apr. 11, 2023, issued in application No. PCT/CN2023/071016.
(Continued)

*Primary Examiner* — Amir Shahnami
(74) *Attorney, Agent, or Firm* — McClure, Qualey & Rodack, LLP

(57) ABSTRACT

A video coder receives data for a block of pixels to be encoded or decoded as a current block of a current picture of a video. The video coder receives a set of transform coefficients of the current block. The video coder identifies multiple transform hypotheses. Each hypothesis includes two or more predicted transform parameters. The video coder computes a cost for each hypothesis by performing inverse transform on the transform coefficients of the current block according to the predicted transform parameters of the hypothesis. The video coder signals or receives a codeword that identifies a first transform mode of a first transform parameter. The codeword is assigned to the first transform mode based on the calculated costs of the multiple transform hypotheses. The video coder encodes or decodes the current block by reconstructing the current block according to the identified first transform mode.

13 Claims, 14 Drawing Sheets

(51) Int. Cl.

| | |
|---|---|
| ***H04N 19/157*** | (2014.01) |
| ***H04N 19/176*** | (2014.01) |
| ***H04N 19/196*** | (2014.01) |

(56) References Cited

U.S. PATENT DOCUMENTS

| | | | | |
|---|---|---|---|---|
| 2018/0288439 | A1* | 10/2018 | Hsu | H04N 19/625 |
| 2019/0373261 | A1 | 12/2019 | Egilmez | |
| 2020/0137393 | A1* | 4/2020 | Henry | H04N 19/18 |
| 2020/0260078 | A1 | 8/2020 | Zhao | |
| 2020/0322636 | A1 | 10/2020 | Egilmez | |
| 2020/0389661 | A1 | 12/2020 | Zhao | |
| 2020/0396455 | A1 | 12/2020 | Liu | |
| 2022/0210451 | A1* | 6/2022 | Jung | H04N 19/18 |
| 2022/0279161 | A1* | 9/2022 | Lim | H04N 19/1883 |
| 2022/0312043 | A1* | 9/2022 | Seregin | H04N 19/134 |
| 2025/0365446 | A1* | 11/2025 | Seregin | H04N 19/13 |

OTHER PUBLICATIONS

Chinese language office action dated Oct. 24, 2023, issued in application No. TW 112100659.

* cited by examiner r: reconstruction of top-left 8x8 sub-blocks
p: previously reconstructed neighbor pixels

SIGNALING FOR TRANSFORM CODING

CROSS REFERENCE TO RELATED PATENT APPLICATION(S)

The present disclosure is part of a non-provisional application that claims the priority benefit of U.S. Provisional Patent Application No. 63/297,264, filed on 7 Jan. 2022. Contents of above-listed applications are herein incorporated by reference.

TECHNICAL FIELD

The present disclosure relates generally to video coding. In particular, the present disclosure relates to signaling for transform coding.

BACKGROUND

Unless otherwise indicated herein, approaches described in this section are not prior art to the claims listed below and are not admitted as prior art by inclusion in this section.

Versatile video coding (VVC) is the latest international video coding standard developed by the Joint Video Expert Team (JVET) of ITU-T SG16 WP3 and ISO/IEC JTC1/SC29/WG11. The input video signal is predicted from the reconstructed signal, which is derived from the coded picture regions. The prediction residual signal is processed by a block transform. The transform coefficients are quantized and entropy coded together with other side information in the bitstream. The reconstructed signal is generated from the prediction signal and the reconstructed residual signal after inverse transform on the de-quantized transform coefficients. The reconstructed signal is further processed by in-loop filtering for removing coding artifacts. The decoded pictures are stored in the frame buffer for predicting the future pictures in the input video signal.

In VVC, a coded picture is partitioned into non-overlapped square block regions represented by the associated coding tree units (CTUs). A coded picture can be represented by a collection of slices, each comprising an integer number of CTUs. The individual CTUs in a slice are processed in raster-scan order. A bi-predictive (B) slice may be decoded using intra prediction or inter prediction with at most two motion vectors and reference indices to predict the sample values of each block. A predictive (P) slice is decoded using intra prediction or inter prediction with at most one motion vector and reference index to predict the sample values of each block. An intra (I) slice is decoded using intra prediction only.

A CTU can be partitioned into one or multiple non-overlapped coding units (CUs) using the quadtree (QT) with nested multi-type-tree (MTT) structure to adapt to various local motion and texture characteristics. A CU can be further split into smaller CUs using one of the five split types: quad-tree partitioning, vertical binary tree partitioning, horizontal binary tree partitioning, vertical center-side triple-tree partitioning, horizontal center-side triple-tree partitioning.

Each CU contains one or more prediction units (PUs). The prediction unit, together with the associated CU syntax, works as a basic unit for signaling the predictor information. The specified prediction process is employed to predict the values of the associated pixel samples inside the PU. Each CU may contain one or more transform units (TUs) for representing the prediction residual blocks. A transform unit (TU) is comprised of a transform block (TB) of luma samples and two corresponding TBs of chroma samples, each TB corresponding to one residual block of samples from one color component. An integer transform is applied to a transform block. The level values of quantized coefficients together with other side information are entropy coded in the bitstream. The terms coding tree block (CTB), coding block (CB), prediction block (PB), and transform block (TB) are defined to specify the 2-D sample array of one color component associated with CTU, CU, PU, and TU, respectively. Thus, a CTU consists of one luma CTB, two chroma CTBs, and associated syntax elements. A similar relationship is valid for CU, PU, and TU.

For achieving high compression efficiency, the context-based adaptive binary arithmetic coding (CABAC) mode, or known as regular mode, is employed for entropy coding the values of the syntax elements in VVC. As the arithmetic coder in the CABAC engine can only encode the binary symbol values, the CABAC operation first needs to convert the value of a syntax element into a binary string, the process commonly referred to as binarization. During the coding process, the accurate probability models are gradually built up from the coded symbols for the different contexts. The selection of a modeling context for coding the next binary symbol can be determined by the coded information. Symbols can be coded without the context modeling stage and assume an equal probability distribution, commonly referred to as the bypass mode, for improving bitstream parsing throughput rate.

SUMMARY

The following summary is illustrative only and is not intended to be limiting in any way. That is, the following summary is provided to introduce concepts, highlights, benefits and advantages of the novel and non-obvious techniques described herein. Select and not all implementations are further described below in the detailed description. Thus, the following summary is not intended to identify essential features of the claimed subject matter, nor is it intended for use in determining the scope of the claimed subject matter.

Some embodiments of the disclosure provide a video coder that signals transform coding based on boundary matching costs of various transform parameters. The video coder receives data for a block of pixels to be encoded or decoded as a current block of a current picture of a video. The video coder receives a set of transform coefficients of the current block. The video coder identifies multiple transform hypotheses. Each hypothesis includes two or more predicted transform parameters. Each transform parameter is selectively configurable as one of multiple transform modes. The video coder computes a cost for each hypothesis by performing inverse transform on the transform coefficients of the current block according to the predicted transform parameters of the hypothesis. The video coder signals or receives a codeword that identifies a first transform mode of a first transform parameter. The codeword is assigned to the first transform mode based on the calculated costs of the multiple transform hypotheses. The video coder encodes or decodes the current block by reconstructing the current block according to the identified first transform mode.

In some embodiments, the predicted transform parameters of a hypothesis include a primary transform type and a secondary transform type. The predicted transform parameters may also include a transform kernel size. The predicted transform parameters of a hypothesis may include a set of predicted signs for the received transform coefficients and a transform type.

In some embodiments, the cost for each hypothesis may include a similarity measure that is computed based on samples neighboring the current block and samples of the current block that are reconstructed according to the hypothesis along boundaries of the current block. In some embodiments, the similarity measure is computed based on samples along only one side of the current block. In some embodiments, the similarity measure is computed based on samples that are identified according to an intra prediction direction for the current block. In some embodiments, the cost for each hypothesis is computed by performing inverse transform on only a subset and not all of the transform coefficients of the current block. In some embodiments, the predicted transform parameters of a hypothesis include predicted signs of only a subset and not all of the transform coefficients of the current block.

In some embodiments, the codeword is assigned to the first transform mode based on the calculated costs of the multiple transform hypotheses. The first transform parameter maybe a primary transform type and the identified first transform mode is represented by a Multiple Transform Selection (MTS) index. The first transform parameter may also be a secondary transform type and the identified first transform mode is represented by a non-separable secondary transforms (NSST) index. The encoder may assign codewords to different primary or secondary transform types based on the computed costs, wherein a shortest codeword is assigned to a transform type associated with a lowest cost transform hypothesis.

BRIEF DESCRIPTION OF THE DRAWINGS

The accompanying drawings are included to provide a further understanding of the present disclosure, and are incorporated in and constitute a part of the present disclosure. The drawings illustrate implementations of the present disclosure and, together with the description, serve to explain the principles of the present disclosure. It is appreciable that the drawings are not necessarily in scale as some components may be shown to be out of proportion than the size in actual implementation in order to clearly illustrate the concept of the present disclosure.

DETAILED DESCRIPTION

In the following detailed description, numerous specific details are set forth by way of examples in order to provide a thorough understanding of the relevant teachings. Any variations, derivatives and/or extensions based on teachings described herein are within the protective scope of the present disclosure. In some instances, well-known methods, procedures, components, and/or circuitry pertaining to one or more example implementations disclosed herein may be described at a relatively high level without detail, in order to avoid unnecessarily obscuring aspects of teachings of the present disclosure.

I. Prediction of Transform Coefficient Signs for Context Coding

Figure 1:
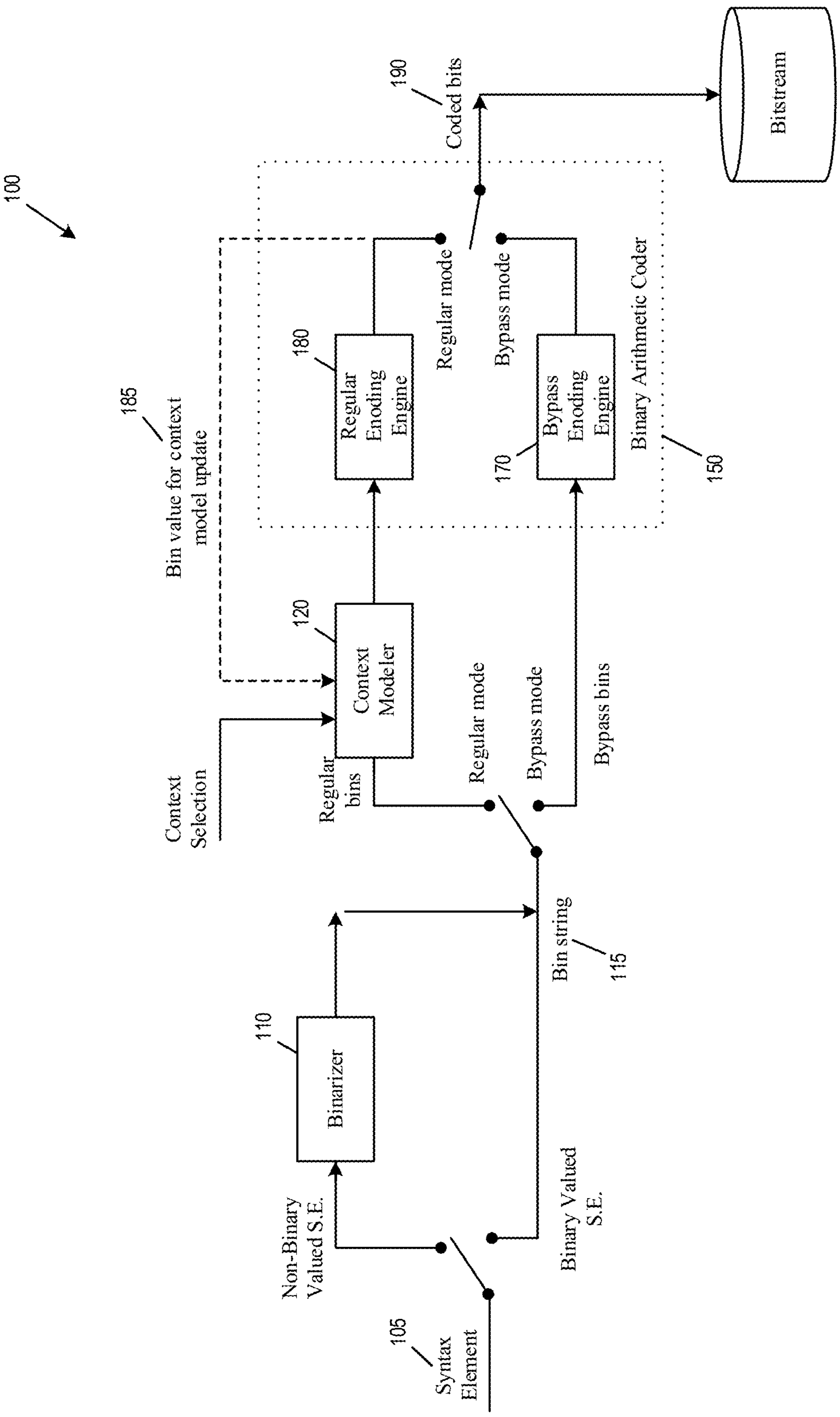
FIG. 1 shows a block diagram of an engine that performs a context-based adaptive binary arithmetic coding (CABAC) process.

In some embodiments, for achieving higher compression efficiency in video coding, context-based adaptive binary arithmetic coding (CABAC) mode, or known as regular mode, is employed for entropy coding syntax elements of coded video. FIG. 1 shows a block diagram of an engine that performs a CABAC process.

The CABAC operation first convert the value of a syntax elements (SE) 105 into a binary string 115. This process is commonly referred to as binarization (at a binarizer 110).

The arithmetic coder 150 performs a coding process on the binary string 115 to produce coded bits 190. The coding process can be performed in regular mode (through a regular encoding engine 180) or bypass mode (through a bypass encoding engine 170).

When the regular mode is used, a context modeler 120 performs context modeling on the incoming binary string (or bins) 115 and the regular encoding engine 180 performs the coding process on the binary string 115 based on the probability models of different contexts in the context modeler 120. The coding process of the regular mode produces coded binary symbols 185, which are also used by the context modeler 120 to build or update the probability models. The selection of a modeled context (context selection) for coding the next binary symbol can be determined by the coded information. On the other hand, when bypass mode is used, symbols are coded without the context modeling stage and assume an equal probability distribution.

In some embodiments, in order to improve coding efficiency, a collection of signs of the transform coefficients of a residual transform block are jointly predicted.

Figure 2:
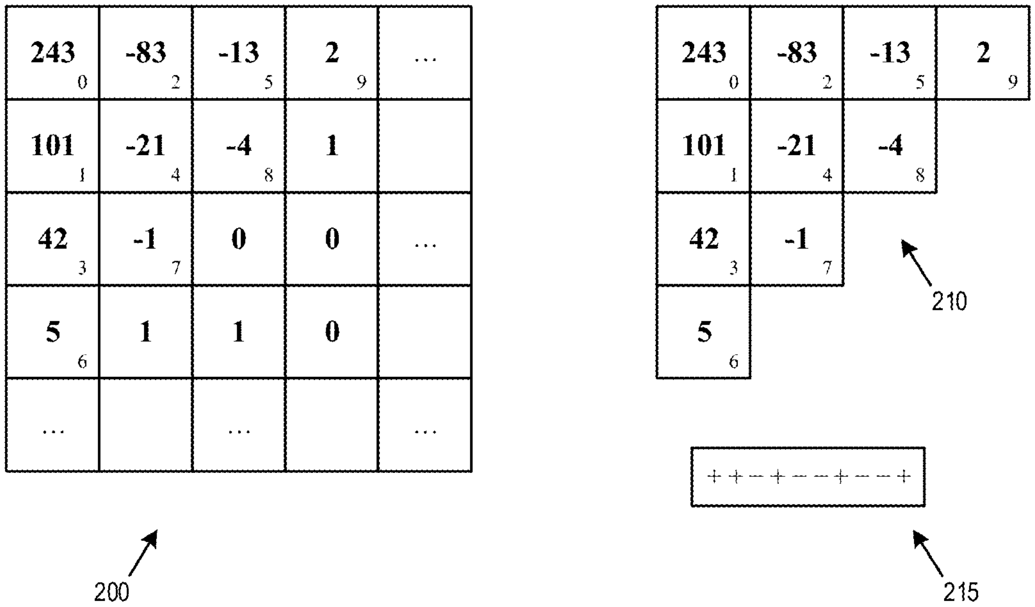
FIG. 2 illustrates transform coefficients in a transform block.

FIG. 2 illustrates transform coefficients in a transform block. The transform block 200 is an array of transform coefficients from transformed inter- or intra-prediction residuals. The transform block 200 may be one of several transform blocks of the current block being coded, which may have multiple transform blocks for different color components. The transform block includes N×N transform coefficients. One of the transform coefficients is the DC coefficient. The coefficients of the transform block 200 may be ordered and indexed in a zig-zag fashion. The transform coefficients of the current transform block 200 are signed, but only the signs of a subset 210 of the transform coefficients are jointly predicted (e.g., the first 10 non-zero coefficients) as a collection of signs 215.

Figure 3:
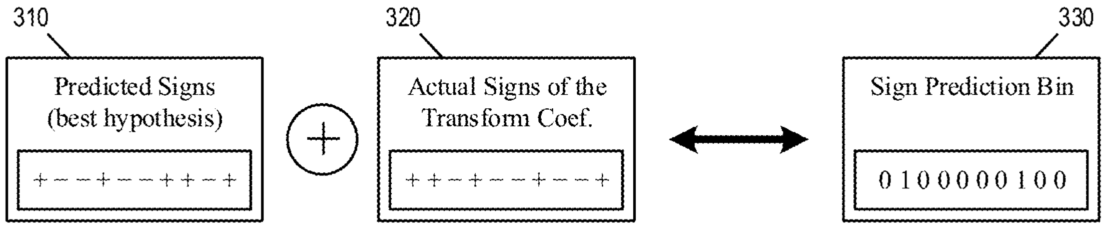
FIG. 3 conceptually illustrates sign prediction for a collection of signs of transform coefficients.

FIG. 3 conceptually illustrates sign prediction for a collection of signs of transform coefficients. The figure illustrates a collection of actual signs 320 (e.g., the transform coefficient signs in the subset 210) and a corresponding collection of predicted signs 310. The actual signs 320 and the predicted signs 310 are XORed (exclusive or) together to generate sign prediction residuals 330. In the example sign prediction residuals 330, a '0' represent a correctly predicted sign (i.e., the predicted sign and the corresponding actual sign are the same), and a '1' represent an incorrectly predicted sign (i.e., the predicted sign and the corresponding actual sign are different.) Thus, a "good" sign prediction would result in the sign prediction residuals 330 having mostly 0s, so the sign prediction residuals 330 can be coded by CABAC using fewer bits.

A sign prediction residual that is currently being processed by CABAC context modeling can be referred to as the current sign prediction residual. The transform coefficient that corresponds to the current sign prediction residual can be referred to as the current transform coefficient, and the transform block whose transform coefficients are currently processed by CABAC can be referred to as the current transform block.

In some embodiments, both video encoder and video decoder determine a "best" set of predicted signs by examining different possible combinations or sets of predicted signs. Each possible combination of predicted signs is referred to as a sign prediction hypothesis. The collection of signs in the best candidate sign prediction hypothesis is used as the predicted signs 310 for generating the sign prediction residuals 330. (A video encoder uses the signs of the best hypothesis 310 and the actual signs 320 to generate the sign prediction residual 330 for CABAC. A video decoder receives sign prediction residuals 330 from inverse CABAC and uses the predicted signs 310 of the best hypothesis to reconstruct the actual signs 320.)

In some embodiments, a cost function is used to examine the different candidate sign prediction hypotheses and identify a best candidate sign prediction hypothesis. Reconstructed residuals are calculated for all candidate sign prediction hypotheses (including both negative and positive sign combinations for applicable transform coefficients.) The candidate hypothesis having the minimum (best) cost is selected for the transform block. The cost function may be defined based on discontinuity measures (or similarity measures) across block boundaries, specifically, as a sum of absolute second derivatives in the residual domain for the above row and left column. Thus, the cost is also referred to as boundary matching cost of the block, or block boundary matching cost.

The cost function is as follows:

$$\text{cost} = \sum_{x=0}^{w-1} |(-R_{x,-2} + 2R_{x,-1} - P_{x,0}) - r_{x,0}| + \sum_{y=0}^{h-1} |(-R_{-2,y} + 2R_{-1,y} - P_{0,y}) - r_{0,y}| \quad (1)$$

where R is reconstructed neighbors, P is prediction of the current block, and r is the prediction residual of the hypothesis being tested. The cost function is measured for all candidate sign prediction hypotheses, and the candidate hypothesis with the smallest cost is selected as a predictor for coefficient signs (predicted signs).

Figure 4:
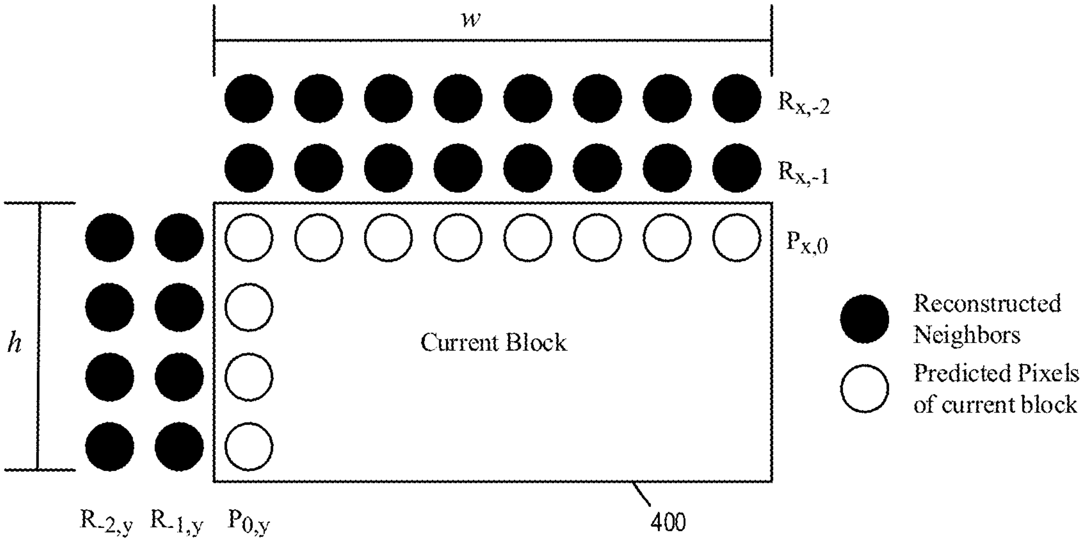
FIG. 4 conceptually illustrates discontinuity measures across block boundaries for a current block.

FIG. 4 conceptually illustrates discontinuity measures across block boundaries for a current block 400. The figure shows the pixel positions of the reconstructed neighbors $R_{x,-2}$, $R_{x,-1}$, $R_{-2,y}$, $R_{-1,y}$ above and to the left of the current block and predicted pixels $P_{x,0}$, $P_{0,y}$ of the current block that are along the top and left boundaries. The positions of $P_{x,0}$, $P_{0,y}$ are also that of the prediction residuals $r_{x,0}$, $r_{0,y}$ of a sign prediction hypothesis. The predicted pixels $P_{x,0}$, $P_{0,y}$ may be provided by a motion vector and a reference block. The prediction residuals $r_{x,0}$, $r_{0,y}$ are obtained by inverse transform of the coefficients, with each coefficient having a predicted sign provided by the sign prediction hypothesis. The values of $R_{x,-2}$, $R_{x,-1}$, $R_{-2,y}$, $R_{-1,y}$, $P_{x,0}$, $P_{0,y}$ and $r_{x,0}$, $r_{0,y}$ are used to calculate a discontinuity measure across the block boundaries for the current block 400 according to Eqn (1), which is used as a cost function to evaluate each candidate sign prediction hypothesis.

Figure 5:
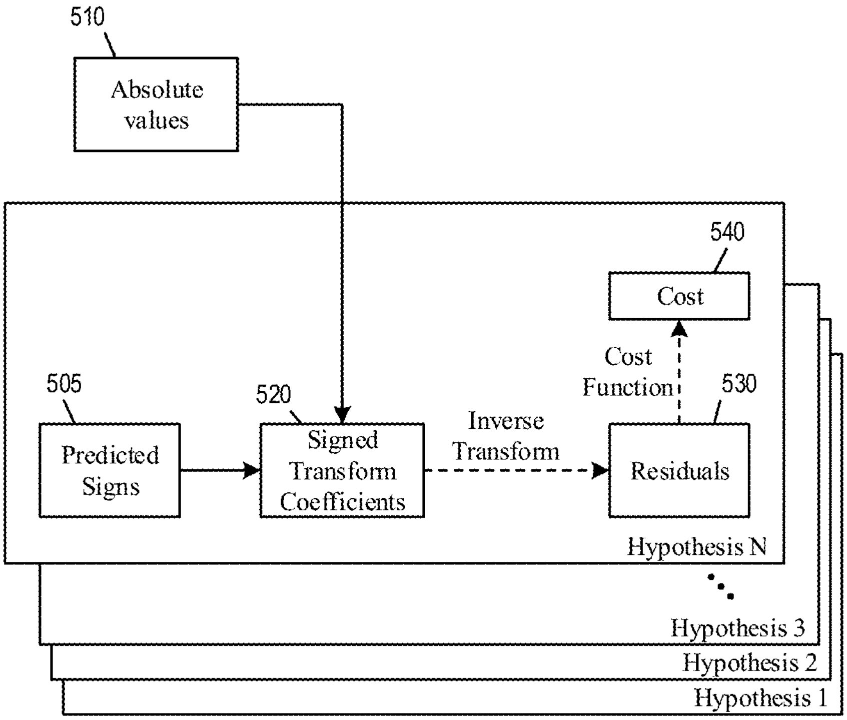
FIG. 5 conceptually illustrates using cost function to select a best sign prediction hypothesis.

FIG. 5 conceptually illustrates using cost function to select a best sign prediction hypothesis. The figure illustrates multiple sign prediction hypotheses (hypothesis 1, 2, 3, 4, . . . ) being evaluated for the current block. Each sign prediction hypothesis has a different collection of predicted signs for the transform coefficients of the current block 400.

To evaluate the cost of a candidate sign prediction hypothesis, the absolute values 510 (of the transform coefficients of a current transform block) are paired with predicted signs 505 of the candidate hypothesis to become signed transform coefficients 520. The signed transform coefficients 520 are inverse transformed to become residuals 530 of the hypothesis in the pixel domain. The residuals at the boundary of the current block (i.e., $r_{x,0}$, $r_{0,y}$) are used by the cost function (Eqn. 1) to determine the cost 540 of the candidate hypothesis. The candidate hypothesis with the lowest cost is then selected as the best sign prediction hypothesis.

In some embodiments, only signs of coefficients from the top-left 4×4 transform subblock region (with lowest frequency coefficients in the transform domain) in a transform block are allowed to be included into a hypothesis. In some embodiments, the maximum number of the predicted signs $N_{sp}$ that can be included in each sign prediction hypothesis of a transform block is signaled in the sequence parameter set (SPS). In some embodiments, this maximum number is constrained to be less than or equal to 8. The signs of first $N_{sp}$ non-zero coefficients (if available) are collected and coded according to a raster-scan order over the top-left 4×4 subblock.

For each of those coefficients (coefficients whose signs are predicted), instead of the coefficient sign, a sign prediction residual is signaled to indicate whether the coefficient sign is equal to the sign predicted by the selected hypothesis. In some embodiments, the sign prediction residual is context coded, where the selected context is derived from whether a coefficient is DC or not. In some embodiments, the contexts are separated for intra and inter blocks, for luma and chroma components. For those other coefficients without sign prediction, the corresponding signs are coded by CABAC in the bypass mode.

II. Prediction of Transform Types

VVC adopts Discrete Cosine Transform type II (DCT-II) as its core transform (or called as primary transform) because it has a strong energy compaction property. Most of the signal information tends to be concentrated in a few low-frequency components of the DCT-II which approximates the Karhunen-Loève Transform (KLT, which is optimal in the decorrelation sense) for signals based on certain limits of Markov processes. The N-point DCT-II of the signal f [n] is defined as:

$$\hat{f}_{DCT-II}[k] = \lambda_k \frac{2}{\sqrt{N}} \sum_{n=0}^{N-1} f[n] \cos\left[\frac{k\pi}{N}\left(n + \frac{1}{2}\right)\right], \quad (2)$$

$$k = 0, 1, 2, \ldots, N-1, \lambda_k = \begin{cases} 2^{-0.5}, & k = 0 \\ 1, & k \neq 0 \end{cases}$$

In addition to DCT transform as core transform for TBs, a secondary transform can be used to further compact the energy of the coefficients and to improve the coding efficiency. Non-separable transform based on Hypercube-Givens Transform (HyGT) can be used as secondary transform. The basic elements of this orthogonal transform are Givens rotations, which are defined by orthogonal matrices G (m, n, θ), which have elements defined by $$G_{i,j}(m, n) = \begin{cases} \cos\theta, & i = j = m \text{ or } i = j = n, \\ \sin\theta, & i = m, j = n, \\ -\sin\theta, & i = n, j = m, \\ 1, & i = j \text{ and } i \neq m \text{ and } i \neq n, \\ 0, & \text{otherwise} \end{cases}.$$

In some embodiments, there are totally 35×3 non-separable secondary transforms (NSST) for both 4×4 and 8×8 TB sizes, where 35 is the number of transform sets specified by the intra prediction mode, and 3 is the number of NSST candidates for each Intra prediction mode. In some embodiments, intra prediction modes 0-34 are mapped to transform sets indices 0-34, respectively; intra prediction modes 35-66 are mapped to transform sets indices 33-2, respectively; the intra prediction mode 67 is mapped a NULL transform set. More transform modes may be adopted as a candidate primary transform and secondary transform.

Enhanced MTS for Intra Coding

In the current VVC design, for Multiple Transform Selection (MTS), only DST7 and DCT8 transform kernels are utilized which are used for intra and inter coding. Additional primary transforms including DCT5, DST4, DST1, and identity transform (IDT) may be employed. Also MTS set is made dependent on the TU size and intra mode information. 16 different TU sizes may be considered, and for each TU size 5 different classes are considered depending on intra-mode information. For each class, 4 different transform pairs are considered. Although a total of 80 different classes are considered, some of those different classes often share exactly same transform set. So there are 58 (less than 80) unique entries in the resultant look-up table (LUT).

For angular modes, a joint symmetry over TU shape and intra prediction is considered. So, a mode i (i>34) with TU shape A×B will be mapped to the same class corresponding to the mode j=(68−i) with TU shape B×A. However, for each transform pair the order of the horizontal and vertical transform kernel is swapped. For example, for a 16×4 block with mode 18 (horizontal prediction) and a 4×16 block with mode 50 (vertical prediction) are mapped to the same class. However, the vertical and horizontal transform kernels are swapped. For the wide-angle modes the nearest conventional angular mode is used for the transform set determination. For example, mode 2 is used for all the modes between −2 and −14. Similarly, mode 66 is used for mode 67 to mode 80. MTS index [0,3] is signaled with 2 bit fixed-length coding.

Secondary Transformation: LFNST Extension with Large Kernel

For some embodiments, the Low Frequency Non-Separable Transform (LFNST) design in VVC is extended as follows: the number of LFNST sets(S) and candidates (C) are extended to S=35 and C=3, and the LFNST set (lfnstTrSetIdx) for a given intra mode (predModeIntra) is derived according to the following formula:

For predModeIntra<2, lfnstTrSetIdx is equal to 2

IfnstTrSetIdx=predModeIntra, for predModeIntra in [0,34]

IfnstTrSetIdx=68-predModeIntra, for predModeIntra in [35,66]

Three different kernels, LFNST4, LFNST8, and LFNST16, are defined to indicate LFNST kernel sets, which are applied to 4×N/N×4 (N≥4), 8×N/N×8 (N≥8), and M×N (M, N≥16), respectively. The kernel dimensions are specified by:

(LFSNT4,LFNST8*,LFNST16*)=(16×16,32×64,32×96)

The forward LFNST is applied to top-left low frequency region, which is called Region-Of-Interest (ROI). When LFNST is applied, primary-transformed coefficients that exist in the region other than ROI are zeroed out. The ROI for LFNST16 consists of six 4×4 sub-blocks that are consecutive in scan order. Since the number of input samples is 96, transform matrix for forward LFNST16 can be R×96 and R is chosen to be 32. 32 coefficients (two 4×4 sub-blocks) are generated from forward LFNST16 accordingly, which follows coefficient scan order.

The ROI of LFST8 consists of four 4×4 sub-blocks that are consecutive in scanning order (therefore left half of the block). Since the number of input samples is 64, transform matrix for forward LFNST8 can be R×64 and R is chosen to be 32. The generated coefficients are in the same manner as with LFNST16.

In some embodiments, intra prediction modes can be mapped to LFNST sets. For example, intra prediction modes −14 through −1 can be mapped to LFNST set index 2; intra prediction modes 0-34 can be mapped to LFNST set indices 0-34, respectively; intra prediction modes 35-65 can be mapped LFNST set indices 33-3, respectively; intra prediction modes 66 through 80 can be mapped to LFNST set index 2.

III. Dynamic Mapping of Secondary Transform Index

Some embodiments provide an efficient signaling method for multiple secondary transforms to further improve the coding performance. Rather than using predetermined, fixed codewords for different secondary transforms, in some embodiments, a prediction method is used to dynamically map the secondary transform index (indicate which secondary transform to be used) into different codewords:

First, a predicted secondary transform index is decided by a predetermined procedure. A cost is given to (or computed for) each candidate secondary transform, and the candidate secondary transform with the smallest cost will be chosen as the predicted secondary transform and the secondary transform index will be mapped to the shortest codeword. For the rest of the secondary transforms, there are several methods to assign the codeword, where in general an order is created for the rest of secondary transforms and the codeword can then be given or assigned according to that order (e.g., shorter codewords are given to the secondary transforms in the front of the order). In some embodiments, a predetermined table is created to specify the order related to the predicted secondary transform. For example, if the predicted secondary transform is one specific rotation, the nearby rotation angle can be put into the front order rather than the far rotation angle. In another embodiment, the order can be created according to the above-mentioned costs. The secondary transform with lower cost will be put in the front of the order.

Second, after a predicted secondary transform is decided and all other secondary transforms are also mapped to an ordered list, the encoder compares the target secondary transform to be signaled with the predicted secondary transform. If the target secondary transform (decided by coding process) happens to be the predicted secondary transform, the codeword for the predicted secondary transform (always the shortest one) can be used for the signaling. If the target secondary transform is not the predicted secondary transform, the encoder can further search the order to find out the position of the target secondary transform and the corresponding final codeword. For the decoder, the same costs are also calculated, and the predicted secondary transform and the same order are also created. If the codeword for the predicted secondary transform is received, the decoder would know that the target secondary transform is just the predicted secondary transform. If the target secondary transform is not the predicted secondary transform, the decoder can look up codewords in the order to find out the target secondary transform. Thus, higher hit rate (higher rate of correct prediction) allows the secondary transform index to be coded using fewer bits.

For higher prediction hit rate, there are several methods to calculate the cost of multiple secondary transforms. In one embodiment, a boundary matching method that measures similarity at boundaries of the block is used to generate the cost for a transform. An example of the boundary matching method will be described in Section IV below.

For one TB of coefficients and one particular secondary transform, they are de-quantized and then inverse transformed to generate the reconstructed residuals. By adding those reconstructed residuals to the predictors, either from intra or inter modes, the reconstructed current pixels can be acquired, which is referred to as one hypothesis reconstruction for that particular secondary transform.

A video coder may also signal the selected primary transform index or mode for a current CU, TU or TB. For example, a Multiple Transform Selection (MTS) scheme for primary transform is used for residual coding both inter and intra coded blocks. A non-zero syntax element mts_idx is signaled to indicate the selected primary transform type, either DCT8 or DST7, in horizontal and vertical dimensions. When mts_idx is equal to 0, the default transform DCT II is employed for primary transform. A transform block can be coded in transform skip mode indicated by a syntax flag transform_skip_flag equal to 1, wherein the residual block is coded in sample domain without transformation operation.

In some embodiments, the signaling of secondary transform and/or primary transform and/or transform skip mode can be subject to index or mode selection. For a TB, transform skip or one transform mode for the primary transform is signaled with an index. When the index is equal to zero, the default transform mode (e.g., DCT-II for both directions) is used. When the index is equal to one, transform skip is used. When the index is larger than 1, one of multiple transform modes (e.g., DST-VII or DCT-VIII used for horizontal and/or vertical transform) can be used. As for the secondary transform, an index (from 0 to 2 or 3) is used to select one secondary transform candidate. When the index is equal to 0, the secondary transform is not applied. In some embodiments, a video coder may exclude the default transform DCT-II for codeword remapping of the selected primary transform or secondary transform.

In some embodiments, the transforms, including transform skip mode and/or primary transform and/or secondary transform can be signaled with one index. The maximum number (or possible value) of this one index is equal to the sum of the number of candidates for primary transforms, the number of candidates for secondary transform and one for the transform skip mode.

In some embodiments, costs are computed for any subset (some or all) of the set of possible transforms, and the signaling of the different transforms is determined based on the computed costs. The set of possible transforms may include 4 candidate primary transform combinations (one default transform+different combinations), 4 candidate secondary transform combination (no secondary transform+2 or 3 candidates), and one transform skip mode. For example, the transforms used may include transform skip mode and the default transform mode for the primary transform, and if the cost of the transform skip mode is smaller than the cost of the default transform mode, the codeword length of transform skip mode will be shorter than the codeword length of the default transform mode. Thus, the index for transform skip mode is assigned with 0 and the index for the default transform mode is assigned with 1. For another example, the transform used is the transform skip mode, and if the cost of the transform skip mode is smaller than a particular threshold, the codeword length of the transform skip mode will be shorter than other transforms for the primary transform. The threshold can vary with the block width or block height or block area.

In some embodiments, costs computed for transforms are used to decide whether to use transform skip or not. Specifically, one cost is calculated for transform skip and the other cost is calculated for the transform mode (which is selected by a transform index or is assigned as a pre-defined transform mode, such as DCT-II or any transform type). The calculated costs are compared and whether to apply transform skip to the current block is decided based on the calculated cost. In some embodiments, the transform skip flag for the current block is implicitly decided at the encoder and decoder. If the cost for transform skip is smallest, transform skip is used for the current block. (The current block may refer to a TU/TB or CU/CB.)

In some embodiments, a video coder may set the selected transform to be the predicted transform and bypass the signaling of the syntax information of the selected transform. The predicted transform is determined by minimization of the cost. For example, a video coder can set the selected primary transform index to be the predicted primary transform index based on the cost of block boundary matching.

IV. Boundary Matching Cost

In some embodiments, the cost of using a particular transform configuration, e.g., particular a transform type (for primary or secondary transform), or a particular transform kernel size, or a particular combination of primary and secondary transform types and kernel size to code the current block can be evaluated by boundary matching cost. Boundary matching cost is a similarity (or discontinuity) measure that quantifies the correlation between the reconstructed pixels of the current block and the (reconstructed) neighboring pixels along the boundaries of the current block. The boundary matching cost based on pixel samples that are reconstructed according to a particular transform configuration is used as the boundary matching cost of that particular transform configuration.

Figure 6:
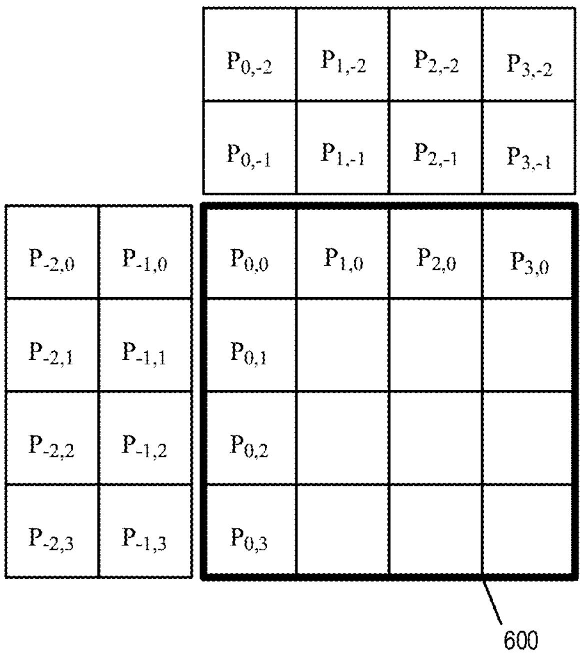
FIG. 6 illustrates the neighboring samples and the reconstructed samples of a 4×4 transform block (TB) that are used for determining boundary matching cost.

FIG. 6 illustrates the neighboring samples and the reconstructed samples of a 4×4 transform block (TB) that are used for determining boundary matching cost. In the figure, $p_{x,-2}$, $p_{x,-1}$ are reconstructed neighboring samples above a current block 600, $p_{-2,y}$, $p_{-1,y}$ are reconstructed neighboring samples left of the current block, $p_{x,0}$, $p_{0,y}$ are samples of the current block 600 along the top and left boundaries that are reconstructed according to a particular transform configuration.

For one 4×4 TB (or a TB of another size), one hypothesis reconstruction is generated for one particular secondary transform, and the cost can be calculated by using the pixels across the top and left boundaries by the following equation that provide a similarity measure (or discontinuity measure) at the top and left boundaries for the hypothesis:

$$\text{cost} = \sum_{x=0}^{w-1} |-p_{x,-2} + 2p_{x,-1} - p_{x,0}| + \sum_{y=0}^{h-1} |-p_{-2,y} + 2p_{-1,y} - p_{0,y}| \quad (3)$$

The cost obtained by using Eqn. (3) can be referred to as the boundary matching cost. In some embodiments, when performing this boundary matching process, only the border pixels need to be reconstructed, unnecessary operations such as inverse secondary transform can be avoided for complexity reduction.

In some embodiments, the TB coefficients can be adaptively scaled or chosen for reconstruction. For example, a video coder may only utilize the transform coefficients from a specified low-frequency transform block region or index range including the DC coefficient for reconstruction of the residual block for estimation of the cost, wherein the transform coefficients outside the specified block region or index range are set equal to 0.

In still another embodiment, the reconstructed residuals can be adaptively scaled or chosen for reconstruction. In still another embodiment, different numbers of boundary pixels or different shapes of boundary regions (only top, only above, or other extension) can be used to calculate the cost. For example, the cost can be estimated from the down-sampled border pixels. In still another embodiment, different cost function can be used to get a better measurement of the boundary similarity. For example, it is possible to consider the different intra prediction directions to adjust the boundary match directions.

When the selected transform is applied to more than one TB, e.g., signaled at a CU or TU, a video coder may estimate the cost based on one TB or more than one TB associated with the selected transform. For example, when the selected transform is applied to a CU/TU having one Cb TB and one Cr TB, the video coder may estimate the cost based on one particular TB or both chroma TBs in the current CU/TU. When the selected transform is applied to a TU having one luma TB and one Cb TB and one Cr TB, the video coder may estimate the cost based on the luma TB or all three TBs in the current CU/TU.

In some embodiments, the cost can be obtained by measuring the features of the reconstructed residuals. For coefficients of one TU of one particular secondary transform, the coefficients will be de-quantized and then inverse transformed to generate the reconstructed residuals. A cost can be given to measure the energy of the reconstructed residuals.

Figure 7:
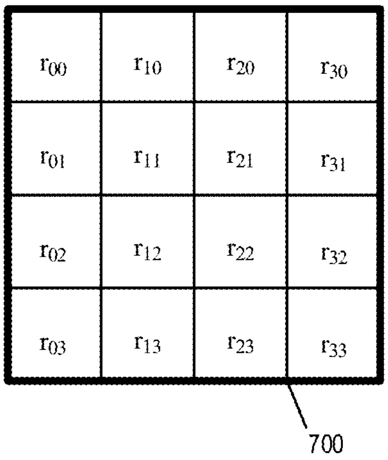
FIG. 7 illustrates the reconstructed residuals of a block that are used to determine the costs of transforms.

FIG. 7 illustrates the reconstructed residuals of a block that are used to determine the costs of transforms. The figure illustrates residuals at different sample positions of a current block 700. A residual at a sample position (x,y) is denoted as $r_{xy}$. For one 4×4 TB, the Different costs can be calculated as the sums of absolute values of different sets of residuals, for example:

$$\text{Cost1} = \sum_{x=0}^{w-1} |r_{x0}| + \sum_{y=1}^{h-1} |r_{0y}|$$

$$\text{Cost2} = \sum_{x=1}^{w-2} \sum_{y=1}^{h-2} |r_{xy}|$$

$$\text{Cost3} = \sum_{x=w/2}^{w-1} \sum_{y=h/2}^{h-1} |r_{xy}|$$

Cost1 is the sum of absolute values of the top row and the left column. Cost2 is the sum of absolute values of the center region of the residuals. Cost3 is the sum of absolute values of the bottom right corner region of the residuals. To generalize, different sets of different shapes of residuals can be used to generate the costs.

V. Determining Predicted Transform Types and Coefficient Signs

Some embodiments of the disclosure provide methods for predicting transform types and coefficient signs based on block boundary matching costs. In some embodiments, when sign prediction is utilized for predicting the signs of transform coefficients in a transform block, the predicted coefficient signs in the transform block are to be derived from the coded residual block with information on (i) the absolute values of transform coefficients and (ii) the coded signs for transform coefficients not subject to sign prediction.

In some embodiments, the predicted signs and the transform type(s) for a transform block are jointly determined by minimization of the cost among all possible hypothesis reconstructions generated by different combinations of signs and transform types. The predicted signs and transform type are set equal to the combination of signs and transform type corresponding to the hypothesis reconstruction with the lowest cost. In some embodiments, the cost is determined by the cost function of Eqn. (1). To reduce computational complexity, the maximum allowed number of predicted signs in a transform block may be reduced when the transform coefficient signs and the selected transform type are to be predicted jointly, compared with the transform block without transform type prediction. Or the max allowed number of predicted signs in a transform block may be lowered when the current TU or CU mode is associated with a large number of transform type selections.

In some embodiments, the predicted transform type(s) and signs of up to $N_{sp}$ transform coefficients in a transform block may be derived by two stages. At the first stage, the predicted transform type(s) and signs of a first collection of transform coefficients in a transform block are jointly determined by minimization of the cost among all possible hypothesis reconstructions of different combinations of transform types and signs of the first collection of transform coefficients. The number of the transform coefficients in the first collection is less than the allowed maximum number of predicted signs $N_{sp}$. For those remaining transform coefficients subject to sign prediction but not in the first collection, their signs have not been determined yet and their transform coefficient levels are all set to 0 for each hypothesis reconstruction of residual signal at the first stage. The predicted transform type for the transform block is set equal to the transform type corresponding to the hypothesis reconstruction with the lowest cost. At the encoder, the syntax information for signaling selected transform type for the current transform block can be determined by the selected transform type and the predicted transform type. At the decoder, the selected transform type for the transform block can be derived by the decoded syntax information on transform type selection and the predicted transform type.

At the second stage, the predicted signs can be determined by minimization of the cost among the reconstructions of all possible sign hypotheses based on the selected transform type at the first stage. In some embodiments, the predicted signs for the first coefficient collection are set to be the signs corresponding to the hypothesis reconstruction with the lowest cost at the first stage. The predicted signs for the remaining coefficients subject to sign prediction are determined at the second stage based on the decoded transform type, signs and absolute values of coefficient levels after the first stage. In another embodiment, all the predicted signs are jointly determined at the second stage based on the selected transform type. In yet another embodiment, when the predicted transform type at the first stage is correct, the predicted signs for the first coefficient collection are set equal to the signs corresponding to the hypothesis reconstruction with the lowest cost and the predicted signs for the remaining coefficients subject to sign prediction are determined at the second stage. Otherwise, all the predicted signs are jointly determined at the second stage based on the selected transform type. In some embodiments, the transform coefficients in the first collection correspond to the transform coefficients from a specified low-frequency transform block region or index range including the DC coefficient. In some other embodiments, the first collection of transform coefficients corresponds to the first $N_0$ transform coefficients subject to sign prediction according to a specified scan order, wherein $N_0$ is less than or equal to $N_{sp}$.

VI. Determination of Non-Separable Secondary Transform Size

Figure 8:
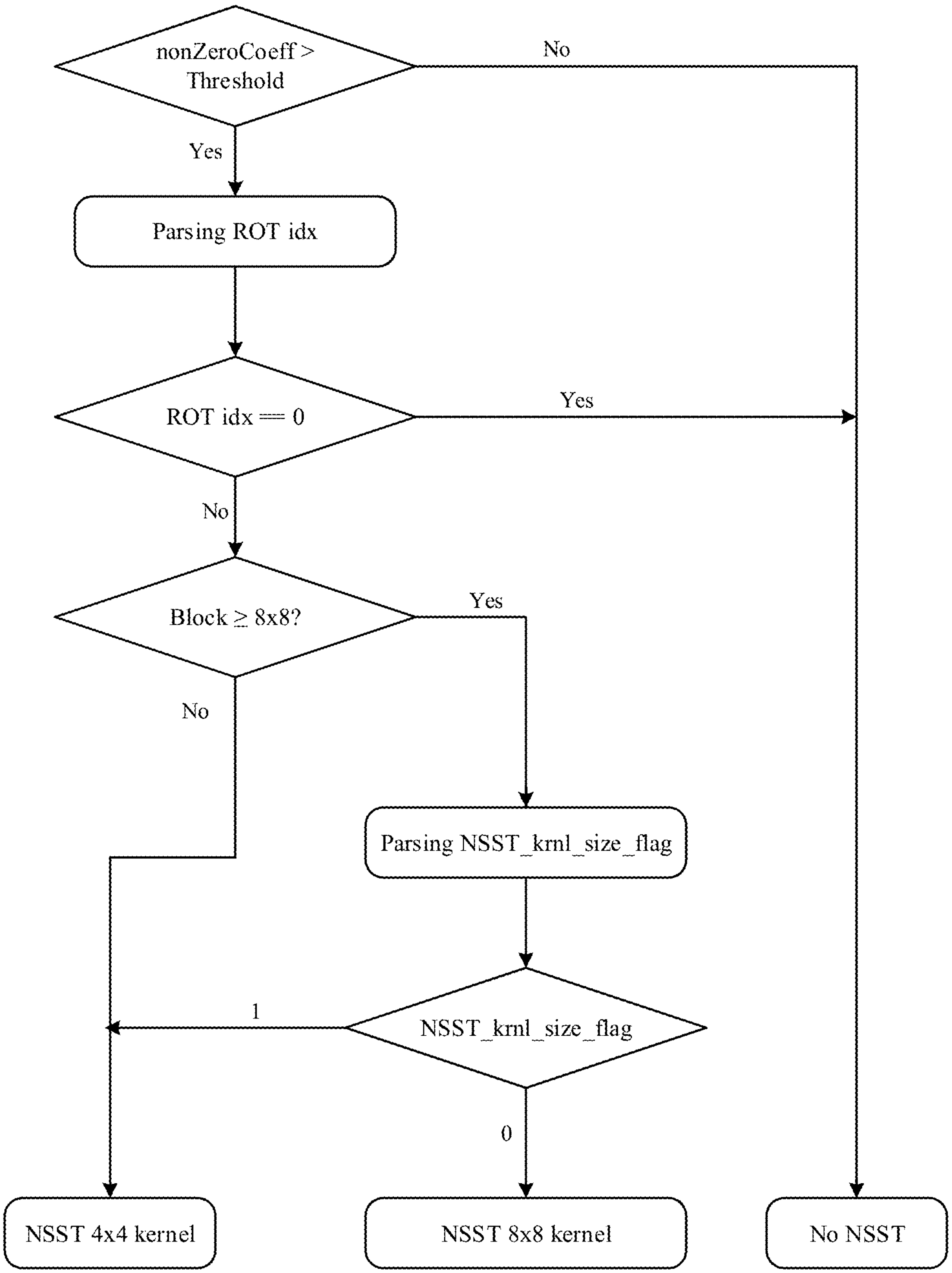
FIG. 8 shows an example flowchart for selecting a secondary transform kernel size for over 8×8 blocks.

In some embodiments, determining the size of secondary transform is dependent on the transform size. For example, if both W and H are larger than 4, 8×8 NSST is then applied as secondary transform, otherwise, 4×4 NSST is used as secondary transform. Furthermore, the secondary transform is applied when the numbers of non-zero coefficients are greater than a threshold. When applied, the non-separable transform is performed on the top-left min (8,W)×min(8,H) region of a transform coefficient block. The above transform selection rule is applied to both luma and chroma components and the kernel size of secondary transform depends on the current coding block size. For over 8×8 blocks, the 8×8 NSST is always applied. Larger blocks may have non-zero coefficients gathered in low frequency area such as 4×4 sub-block region and the best secondary transform is not always 8×8 NSST. Therefore, more generalized NSST selection method can further improve the coding performance. FIG. 8 shows an example flowchart for selecting a secondary transform kernel size for over 8×8 blocks.

However, to select NSST kernel size for over 8×8 blocks may bring less coding gain but suffer dramatic encoding time increases. It is empirically determined that always using a flag to explicitly signal the NSST kernel size for over 8×8 blocks limits the BD-rate enhancement and too much additional RDO checks are employed. Thus, in some embodiments, implicit methods are used to derive the optimal NSST kernel size for certain cases to reduce the bitrate of the additional flag and to reduce run time. In order to prepare for more and more selection of NSST kernel size, some embodiments provide a more effective NSST signaling method. The NSST syntax may be signaled when the current TU has equal to or larger than 2 non-zero coefficients. However, NSST is performed on the top-left min (8,W)×min(8,H) region of a transform coefficient block only. If the non-zero coefficients do not exist in the upper 4×4 or 8×8 sub-block, there is no need to perform the NSST operations.

Explicitly signaling the flag for the NSST kernel size may suffer significant encoding time increases with only minor BD rate improvements. In some embodiments, an effective way to explicitly signal the additional flag is provided. For example, in some embodiments, the optimal NSST kernel size is implicitly derived in certain cases to minimize the bitrate of this extra flag and the complexity of more RDO checks. In addition, the NSST redundant syntax are removed, and the time complexity is reduced. This idea can also be applied to other multiple transformations.

In some embodiments, the flag which stands for the optimal NSST kernel size can be explicitly signaled at SPS, PPS, or slice level. In some embodiments, the flag which stands for the optimal NSST kernel size might not be required and is applied under some limitations such as size constraint. For example, for 8×8 blocks, the flag is employed and used to select the preferred NSST kernel size. As for other over 8×8 blocks, NSST kernel size can be fixed at 8×8 or be derived by an implicit way or be decided by a SPS, PPS, slice level flag.

In some embodiment, an explicit flag for NSST kernel size is used for a complex block. As for the rest, an implicit mechanism is used to make the decision of NSST kernel size selection. That is, whether this flag is required or not should be decided by the block properties. For example, if the block has more coefficients on the top-left 8×8 area (the number of the top-left coefficients is larger than a threshold.), an explicit flag is used to indicate the optimal NSST kernel size.

Figure 9:
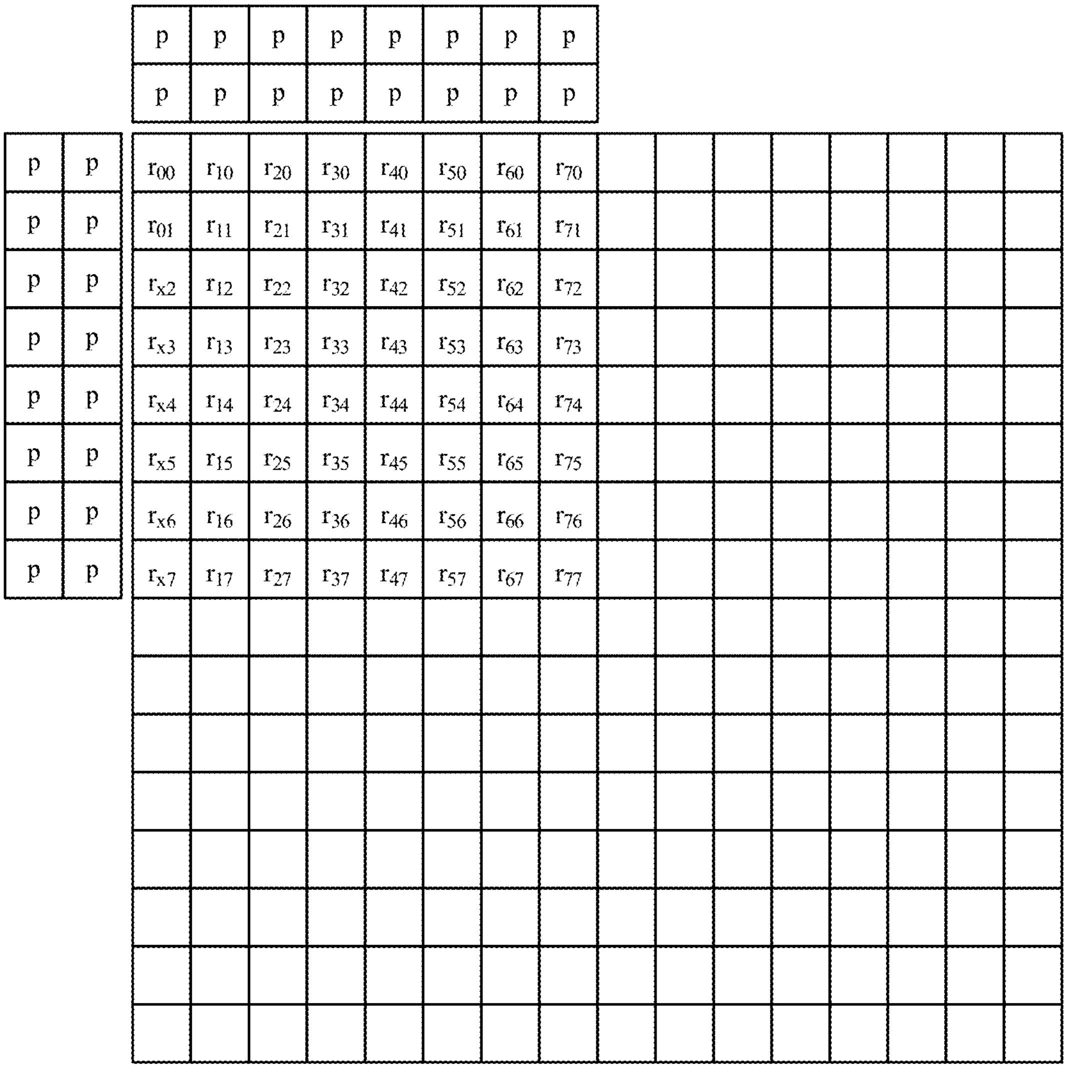
FIG. 9 shows the residuals of the top-left 8×8 sub-blocks that are used for reconstruction generation for a 16×16 TB hypothesis.

In some embodiments, the NSST kernel size can be implicitly signaled. A cost is given to each candidate NSST kernel size. When the smallest cost corresponds to the predicted NSST kernel size, the predicted NSST kernel size would be mapped to the shortest codeword. If the predicted NSST kernel size is not the selected NSST kernel size, the encoder would find out the target NSST size through the suggested order and then signal the target NSST size with the corresponding codeword. That is, for each block, the costs, generated for the candidate NSST kernel sizes, decide the dynamic signaling order. As the prediction procedure producing the predicted NSST kernel size can hit the selected NSST kernel size for more blocks, the less likely bit rate will increase. Many approaches can be applied to calculate the cost for each block. For example, the cost can be obtained by measuring the features of the reconstructed residuals or considering the difference between the boundary and its neighbor blocks. Note that, for each TB, NSST is performed on the top-left 8×8 sub-blocks only, so a prediction procedure may be applied to only those related values. FIG. 9 shows the residuals of the top-left 8×8 sub-blocks that are used for reconstruction generation for a 16×16 TB hypothesis. Empty sub-blocks outside of the top-left 8×8 sub-blocks are those for which NSST is not applied.

In some embodiments, the NSST kernel size can be implicitly derived in certain cases according to different prediction modes and multiple transform indices. For example, the blocks with the modes such as DC/Planar can use 4×4 NSST kernel, while the other modes may choose 8×8 NSST kernel or signal an explicit flag to decide the optimal NSST kernel size. In some other embodiments, the NSST kernel size can be implicitly decided by a predetermined procedure. A cost will be given to each candidate NSST kernel size. The one with the smallest cost will be directly adopted for over 8×8 blocks. At the decoder side, the selected NSST kernel size can be obtained by the same procedure used by the encoder.

The NSST syntax is signaled when the current TU has two or more non-zero coefficients. However, the NSST is only applied to the coefficients of the upper 4×4 or 8×8 block in a TU. If the non-zero coefficients are not in the top-left 4×4 or 8×8 block, the NSST operation is redundant. In some embodiments, syntax related to redundant NSST operations are not signaled. Thus, the NSST syntax is signaled based on the number of non-zero coefficients of the top-left N×M block in a TU. The N and M can be 4 or 8. The value of N and M can be related to the TU width or height. If the number of non-zero coefficient of the top-left 4×4 or 8×8 block is less than two (or certain threshold), the NSST is inferred to be disabled even when there are more than two non-zero coefficients elsewhere.

In some embodiments, the NSST syntax are signaled when the current TU has 2 or more non-zero coefficients. The non-zero coefficients of all TUs are counted. In some embodiments, only the first K coefficients (in forward scan) or the first (top-left) M×N coefficient blocks are counted. K can be 16 or 64, M and N can be 4 or 8. For example, in some embodiments, if the upper 4×4 block has 2 or more non-zero coefficients, the NSST is applied.

Figure 10:
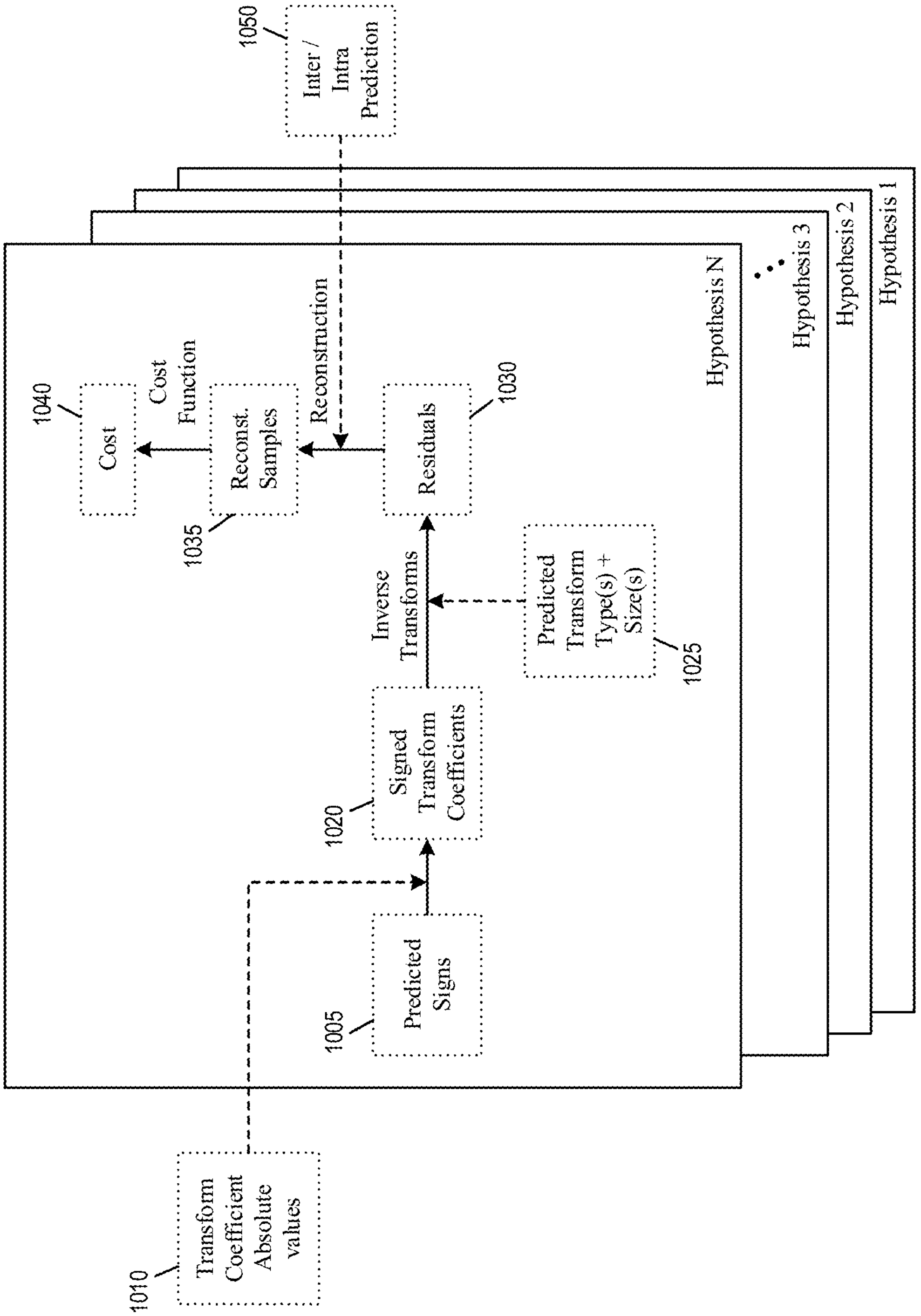
FIG. 10 conceptually illustrates using costs to jointly predict multiple different transform parameters.

FIG. 10 conceptually illustrates using costs to jointly predict multiple different transform parameters such as transform types, coefficient signs, and transform kernel size. The figure illustrates multiple candidate transform hypotheses (hypothesis 1, 2, 3, 4, . . . . N) being evaluated for the current block. Different transform hypotheses are different transform configurations having different collections of predicted signs, different predicted transform types (primary and/or secondary), different predicted transform kernel sizes, and/or other predicted transform parameters.

To evaluate the cost of a transform hypothesis, the absolute values 1010 (of the transform coefficients of a current transform block) are paired with predicted signs 1005 of the candidate hypothesis to become signed transform coefficients 1020. The signed transform coefficients 1020 are inverse transformed, by the predicted transforms (primary and/or secondary) of the candidate hypothesis, to become residuals 1030 of the hypothesis in the pixel domain. The inverse transform may also be performed according to the predicted transform kernel size of the candidate hypothesis.

The residuals 1030 are used by the cost function (e.g., Eqn. 3) to determine the cost 1040 of the candidate hypothesis. In some embodiments, the result of inter-prediction or intra-prediction are added to the residuals 1030 to obtain reconstructed samples 1035 of the current block to determine the cost 1040. In some embodiments, the residuals 1030 are used directly to determine the cost 1040. In some embodiments, only reconstructed samples along the boundary are used for evaluating the cost 1040.

The video coder may therefore identify combinations (or hypotheses) of jointly predicted transform types, transform coefficient signs, and transform kernel size that result in the lowest costs. In some embodiments, shortest codewords can be assigned to transform types and/or transform kernel sizes that are associated with the lowest cost hypotheses, so that the signaling of the lower-cost transform types and/or transform kernel sizes can take minimal number of bits. In some embodiments, both encoder and decoder may implicitly select the lowest cost transform types or transform kernel size, etc.

Any of the foregoing proposed methods can be implemented in encoders and/or decoders. For example, any of the proposed methods can be implemented in a coefficient coding module of an encoder, and/or a coefficient coding module of a decoder. Alternatively, any of the proposed methods can be implemented as a circuit integrated to the coefficient coding module of the encoder and/or the coefficient coding module of the decoder.

VII. Example Video Encoder

Figure 11:
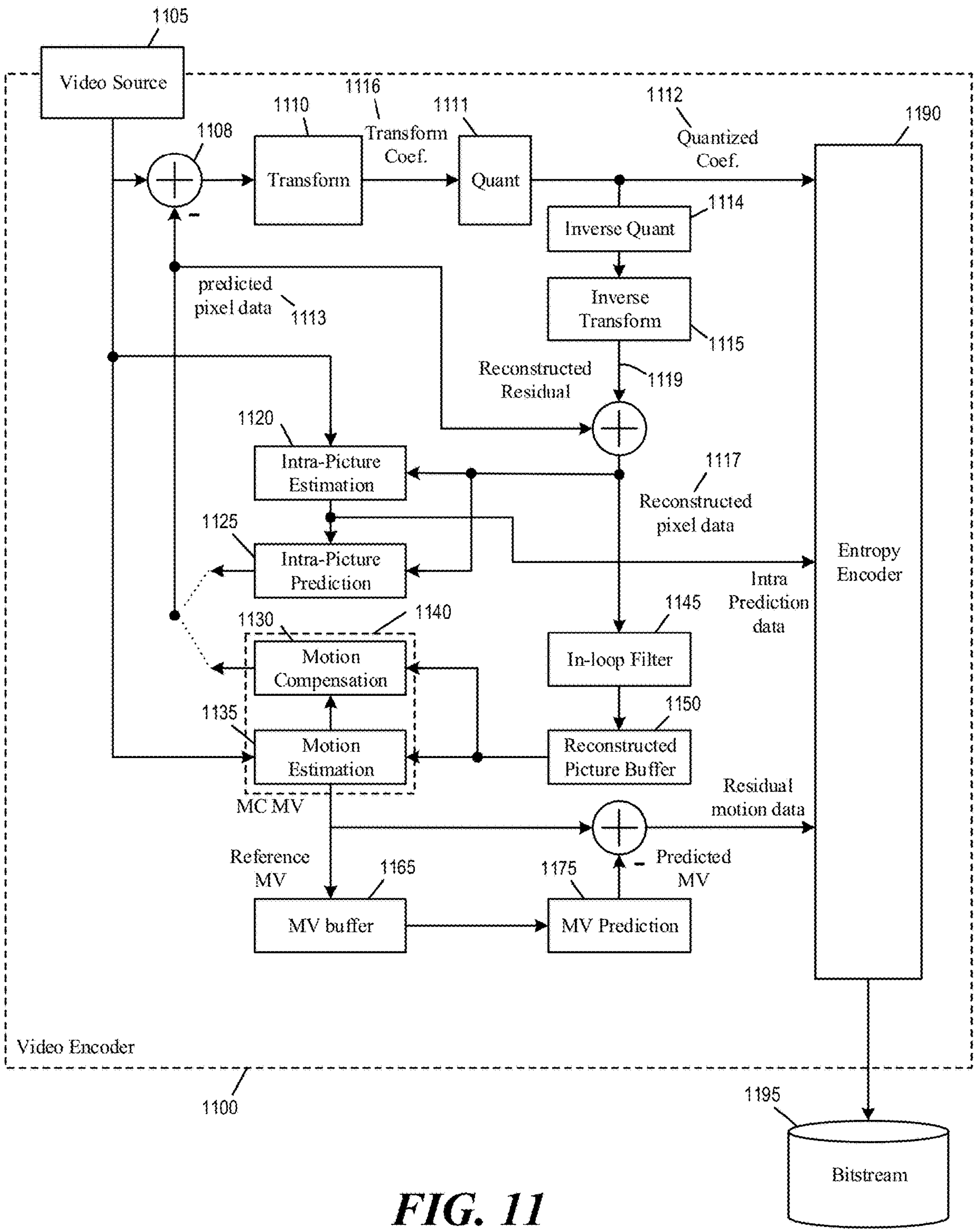
FIG. 11 illustrates an example video encoder that may use boundary matching costs to signal transform coding.

FIG. 11 illustrates an example video encoder 1100 that may use boundary matching costs to signal transform coding. As illustrated, the video encoder 1100 receives input video signal from a video source 1105 and encodes the signal into bitstream 1195. The video encoder 1100 has several components or modules for encoding the signal from the video source 1105, at least including some components selected from a transform module 1110, a quantization module 1111, an inverse quantization module 1114, an inverse transform module 1115, an intra-picture estimation module 1120, an intra-prediction module 1125, a motion compensation module 1130, a motion estimation module 1135, an in-loop filter 1145, a reconstructed picture buffer 1150, a MV buffer 1165, and a MV prediction module 1175, and an entropy encoder 1190. The motion compensation module 1130 and the motion estimation module 1135 are part of an inter-prediction module 1140.

In some embodiments, the modules 1110-1190 are modules of software instructions being executed by one or more processing units (e.g., a processor) of a computing device or electronic apparatus. In some embodiments, the modules 1110-1190 are modules of hardware circuits implemented by one or more integrated circuits (ICs) of an electronic apparatus. Though the modules 1110-1190 are illustrated as being separate modules, some of the modules can be combined into a single module.

The video source 1105 provides a raw video signal that presents pixel data of each video frame without compression. A subtractor 1108 computes the difference between the raw video pixel data of the video source 1105 and the predicted pixel data 1113 from the motion compensation module 1130 or intra-prediction module 1125. The transform module 1110 converts the difference (or the residual pixel data or residual signal 1108) into transform coefficients (e.g., by performing Discrete Cosine Transform, or DCT). The quantization module 1111 quantizes the transform coefficients into quantized data (or quantized coefficients) 1112, which is encoded into the bitstream 1195 by the entropy encoder 1190.

The inverse quantization module 1114 de-quantizes the quantized data (or quantized coefficients) 1112 to obtain transform coefficients, and the inverse transform module 1115 performs inverse transform on the transform coefficients to produce reconstructed residual 1119. The reconstructed residual 1119 is added with the predicted pixel data 1113 to produce reconstructed pixel data 1117. In some embodiments, the reconstructed pixel data 1117 is temporarily stored in a line buffer (not illustrated) for intra-picture prediction and spatial MV prediction. The reconstructed pixels are filtered by the in-loop filter 1145 and stored in the reconstructed picture buffer 1150. In some embodiments, the reconstructed picture buffer 1150 is a storage external to the video encoder 1100. In some embodiments, the reconstructed picture buffer 1150 is a storage internal to the video encoder 1100.

The intra-picture estimation module 1120 performs intra-prediction based on the reconstructed pixel data 1117 to produce intra prediction data. The intra-prediction data is provided to the entropy encoder 1190 to be encoded into bitstream 1195. The intra-prediction data is also used by the intra-prediction module 1125 to produce the predicted pixel data 1113.

The motion estimation module 1135 performs inter-prediction by producing MVs to reference pixel data of previously decoded frames stored in the reconstructed picture buffer 1150. These MVs are provided to the motion compensation module 1130 to produce predicted pixel data.

Instead of encoding the complete actual MVs in the bitstream, the video encoder 1100 uses MV prediction to generate predicted MVs, and the difference between the MVs used for motion compensation and the predicted MVs is encoded as residual motion data and stored in the bitstream 1195.

The MV prediction module 1175 generates the predicted MVs based on reference MVs that were generated for encoding previously video frames, i.e., the motion compensation MVs that were used to perform motion compensation. The MV prediction module 1175 retrieves reference MVs from previous video frames from the MV buffer 1165. The video encoder 1100 stores the MVs generated for the current video frame in the MV buffer 1165 as reference MVs for generating predicted MVs.

The MV prediction module 1175 uses the reference MVs to create the predicted MVs. The predicted MVs can be computed by spatial MV prediction or temporal MV prediction. The difference between the predicted MVs and the motion compensation MVs (MC MVs) of the current frame (residual motion data) are encoded into the bitstream 1195 by the entropy encoder 1190.

The entropy encoder 1190 encodes various parameters and data into the bitstream 1195 by using entropy-coding techniques such as context-adaptive binary arithmetic coding (CABAC) or Huffman encoding. The entropy encoder 1190 encodes various header elements, flags, along with the quantized transform coefficients 1112, and the residual motion data as syntax elements into the bitstream 1195. The bitstream 1195 is in turn stored in a storage device or transmitted to a decoder over a communications medium such as a network.

The in-loop filter 1145 performs filtering or smoothing operations on the reconstructed pixel data 1117 to reduce the artifacts of coding, particularly at boundaries of pixel blocks. In some embodiments, the filtering operation performed includes sample adaptive offset (SAO). In some embodiment, the filtering operations include adaptive loop filter (ALF).

Figure 12:
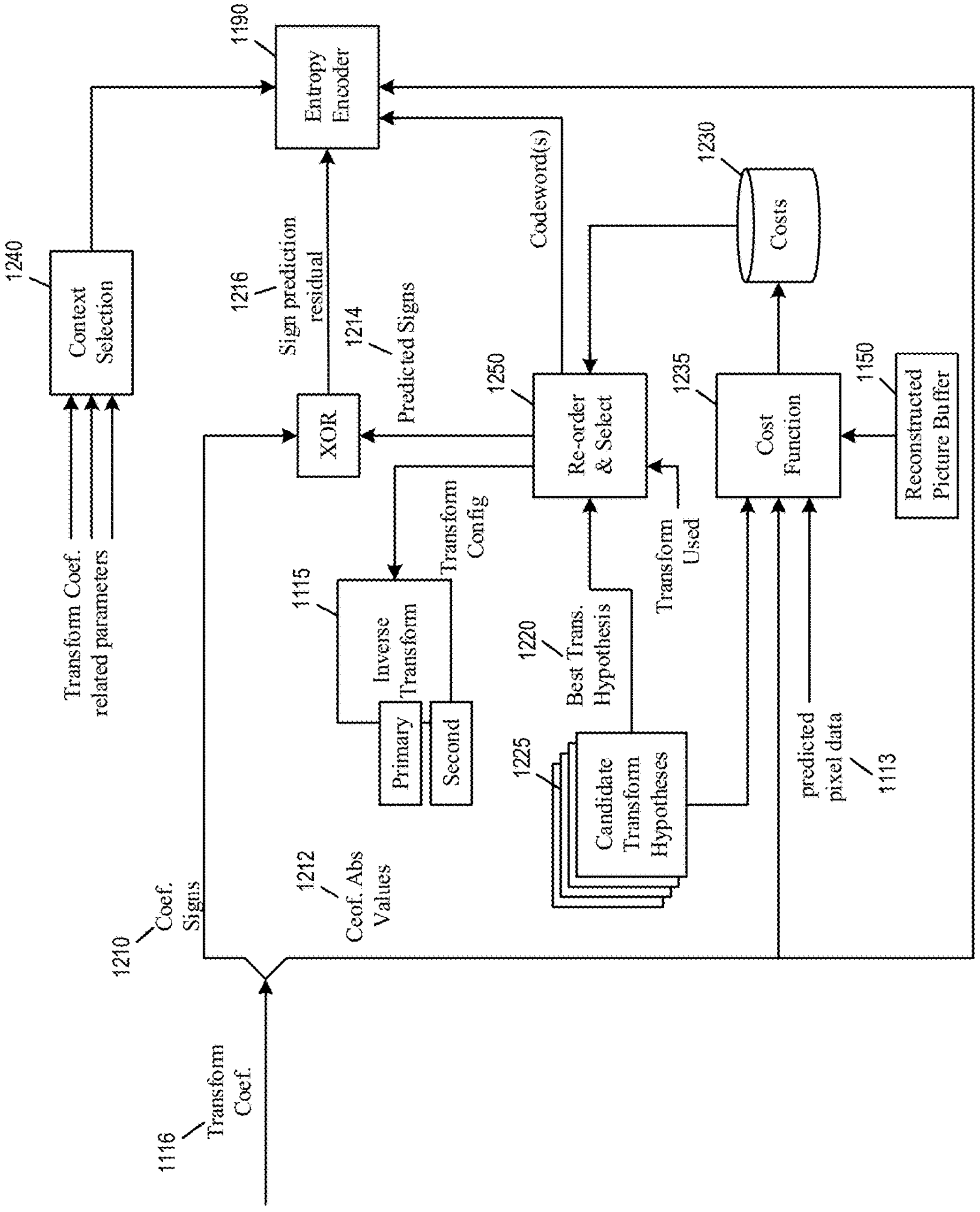
FIG. 12 illustrates portions of the video encoder that implements signaling for transform coding based on boundary matching costs.

FIG. 12 illustrates portions of the video encoder 1100 that implements signaling for transform coding based on boundary matching costs. As illustrated, the transform coefficients 1116 (provided by transform module 1110) includes coefficient signs 1210 and coefficient absolute values 1212 components. The coefficient signs 1210 (or the actual signs) are XOR'ed with predicted signs 1214 to generate sign prediction residuals 1216. The predicted signs 1214 are provided by a best prediction hypothesis 1220, which is selected from multiple possible different candidate transform hypotheses 1225 based on costs 1230. The sign prediction residuals 1216 are provided to the entropy encoder 1190 and coded by the CABAC process. A block diagram of the CABAC process is described by reference FIG. 1 above.

Each candidate transform hypothesis specifies a predicted transform configuration that includes multiple transform parameters. The multiple transform parameters being jointly predicted by the hypothesis may include two or more of the following transform parameters: (i) a primary transform type, (ii) a secondary transform type, (iii) a transform kernel size, and (iv) a set of coefficient signs.

The costs 1230 are computed by a cost function 1235 for different candidate transform hypotheses 1225. For each candidate transform hypothesis, the cost function 1235 uses (i) pixel values provided by the reconstructed picture buffer 1150, (ii) the absolute values 1212 of the transform coefficients, and (iii) the predicted pixel data 1113 to compute a cost. In some embodiments, the cost of a particular transform hypothesis may be computed based on residuals in pixel domain that are inverse transformed from a set of transform coefficients having the set of predicted signs of the sign prediction, and according to the transform parameters of the transform hypothesis (e.g., primary transform type, secondary transform type, transform kernel size, etc.). An example of the cost function is provided by Eqn. (3). An example of the cost calculation operation for a transform hypothesis is described by reference to FIG. 10 above.

A re-reorder and select module 1250 receives the costs 1230 of the various transform hypothesis 1225 as computed by the cost function 1235. The re-reorder and select module 1250 then assigns codewords to the various transform parameters based on the computed costs of the different transform hypotheses 1225. Thus, for example, the shortest codewords may be assigned to primary and secondary transforms that are specified by the best transform hypothesis 1220 (having the lowest cost).

The encoder may, based on rate-distortion considerations specify a transform configuration that selects a primary transform type, a secondary transform type, transform kernel size, and/or other transform parameters. These transform parameters are used by the transform module 1110 to transform (primary and secondary) the residuals of the current block into coefficients. These transform parameters are also to be used by the inverse transform module 1115 to inverse transform (primary and secondary) the coefficients into residuals of the current block. The re-reorder and select module 1250 maps the selected transform parameters to their assigned codewords, and provide the codewords of the selected transform parameters to the entropy encoder 1190 to be included in the bitstream 1195. In some embodiments, a transform type/size may be implicitly selected based on the costs 1230 so no codeword is provided.

Figure 13:
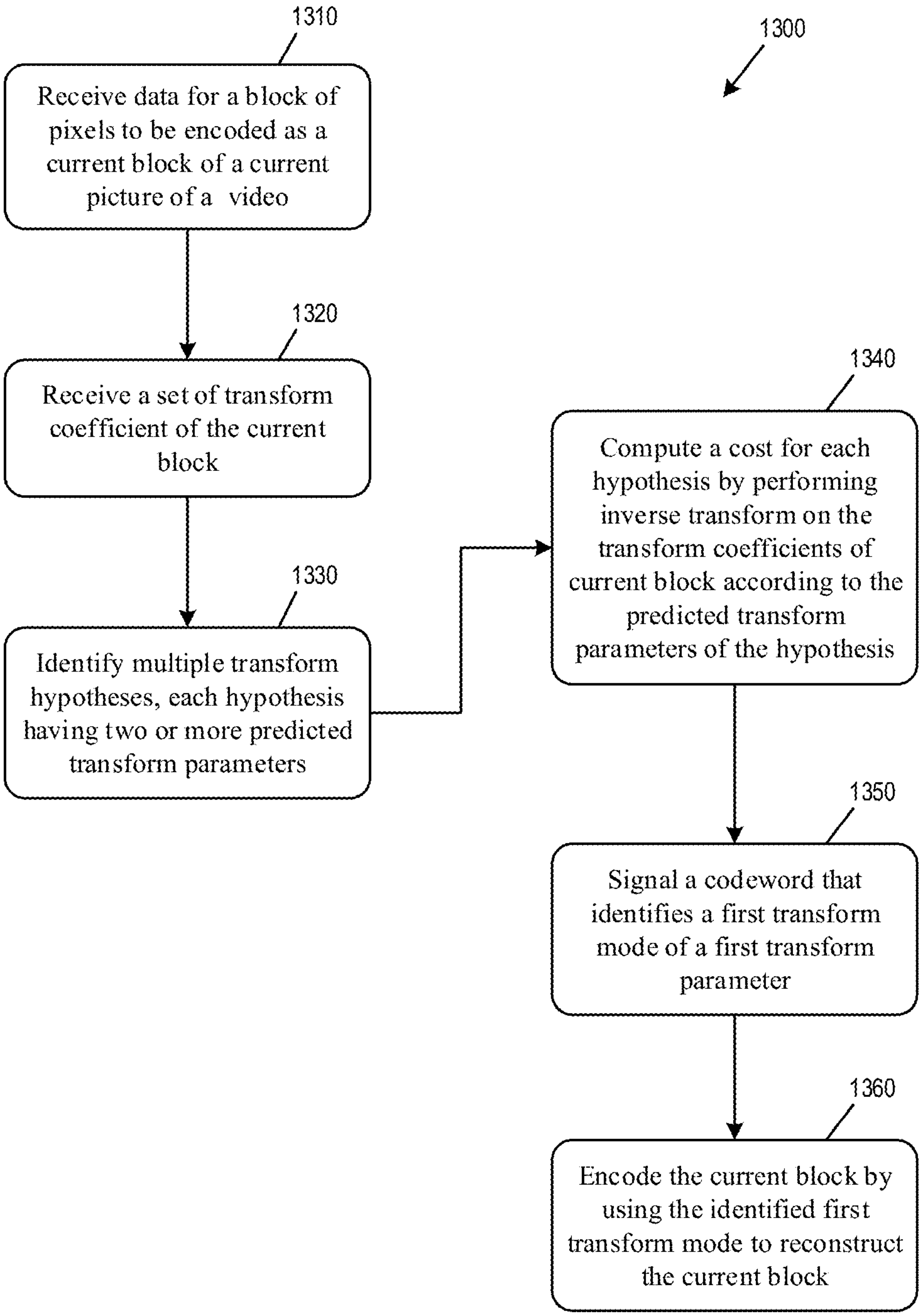
FIG. 13 conceptually illustrates a process for signaling transform coding based on boundary matching costs.

FIG. 13 conceptually illustrates a process 1300 for signaling transform coding based on boundary matching costs. In some embodiments, one or more processing units (e.g., a processor) of a computing device implementing the encoder 1100 performs the process 1300 by executing instructions stored in a computer readable medium. In some embodiments, an electronic apparatus implementing the encoder 1100 performs the process 1300.

The encoder receives (at block 1310) data for a block of pixels to be encoded as a current block of a current picture of a video.

The encoder receives (at block 1320) a set of transform coefficients of the current block. The transform coefficients may be generated by forward transform operations of the encoder on the current block.

The encoder identifies (at block 1330) multiple transform hypotheses. Each hypothesis has two or more predicted transform parameters. Each transform parameter is selectively configurable as one of multiple transform modes. In some embodiments, the predicted transform parameters of a hypothesis include a primary transform type and a secondary transform type. The predicted transform parameters may also include a transform kernel size. The predicted transform parameters of a hypothesis may include a set of predicted signs for the received transform coefficients and a transform type.

The encoder computes (at block 1340) a cost for each hypothesis by performing inverse transform on the transform coefficients of the current block according to the predicted transform parameters of the hypothesis. The cost for each hypothesis may include a similarity measure that is computed based on samples neighboring the current block and samples of the current block that are reconstructed according to the hypothesis along boundaries of the current block. In some embodiments, the similarity measure is computed based on samples along only one side of the current block. In some embodiments, the similarity measure is computed based on samples that are identified according to an intra prediction direction for the current block. In some embodiments, the cost for each hypothesis is computed by performing inverse transform on only a subset and not all of the transform coefficients of the current block (e.g., only the coefficients in the ROI or within a specific index range). In some embodiments, the predicted transform parameters of a hypothesis include predicted signs of only a subset and not all of the transform coefficients of the current block.

The encoder signals (at block 1350) a codeword that identifies a first transform mode of a first transform parameter. The codeword is assigned to the first transform mode based on the calculated costs of the multiple transform hypotheses. The first transform parameter maybe a primary transform type and the identified first transform mode is represented by a Multiple Transform Selection (MTS) index. The first transform parameter may also be a secondary transform type and the identified first transform mode is represented by a non-separable secondary transforms (NSST) index. The encoder may assign codewords to different primary or secondary transform types based on the computed costs, wherein a shortest codeword is assigned to a transform type associated with a lowest cost transform hypothesis.

The encoder encodes (at block 1360) the current block by using the identified first transform mode to reconstruct the current block. Specifically, the current block is reconstructed using inverse transform operations specified based on the first transform mode.

VIII. Example Video Decoder

In some embodiments, an encoder may signal (or generate) one or more syntax element in a bitstream, such that a decoder may parse said one or more syntax element from the bitstream.

Figure 14:
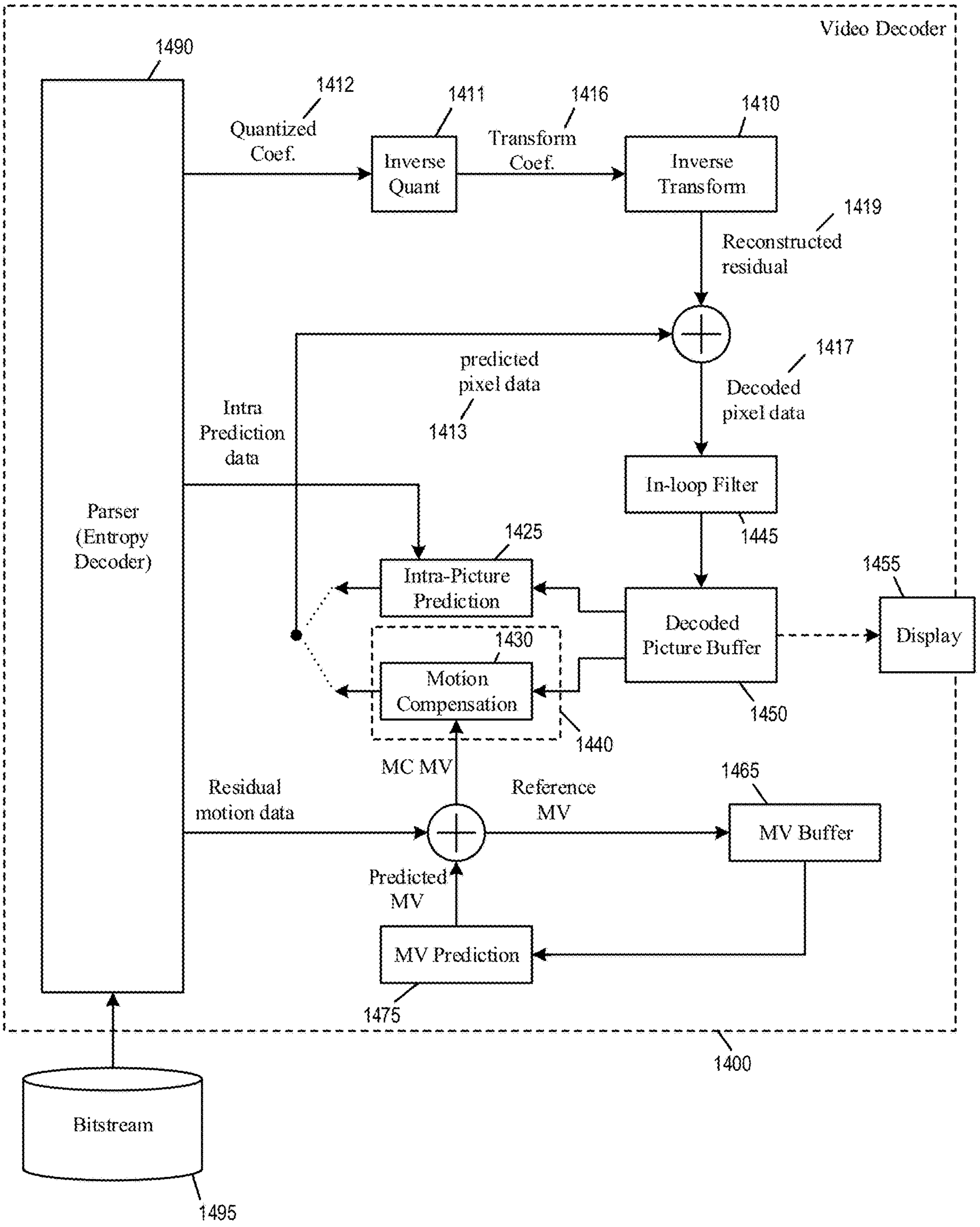
FIG. 14 illustrates an example video decoder that may use boundary matching costs to receive transform coding.

FIG. 14 illustrates an example video decoder 1400 that may use boundary matching costs to receive transform coding. As illustrated, the video decoder 1400 is an image-decoding or video-decoding circuit that receives a bitstream 1495 and decodes the content of the bitstream into pixel data of video frames for display. The video decoder 1400 has several components or modules for decoding the bitstream 1495, including some components selected from an inverse quantization module 1411, an inverse transform module 1410, an intra-prediction module 1425, a motion compensation module 1430, an in-loop filter 1445, a decoded picture buffer 1450, a MV buffer 1465, a MV prediction module 1475, and a parser 1490. The motion compensation module 1430 is part of an inter-prediction module 1440.

In some embodiments, the modules 1410-1490 are modules of software instructions being executed by one or more processing units (e.g., a processor) of a computing device. In some embodiments, the modules 1410-1490 are modules of hardware circuits implemented by one or more ICs of an electronic apparatus. Though the modules 1410-1490 are illustrated as being separate modules, some of the modules can be combined into a single module.

The parser 1490 (or entropy decoder) receives the bitstream 1495 and performs initial parsing according to the syntax defined by a video-coding or image-coding standard. The parsed syntax element includes various header elements, flags, as well as quantized data (or quantized coefficients) 1412. The parser 1490 parses out the various syntax elements by using entropy-coding techniques such as context-adaptive binary arithmetic coding (CABAC) or Huffman encoding.

The inverse quantization module 1411 de-quantizes the quantized data (or quantized coefficients) 1412 to obtain transform coefficients, and the inverse transform module 1410 performs inverse transform on the transform coefficients 1416 to produce reconstructed residual signal 1419. The reconstructed residual signal 1419 is added with predicted pixel data 1413 from the intra-prediction module 1425 or the motion compensation module 1430 to produce decoded pixel data 1417. The decoded pixels data are filtered by the in-loop filter 1445 and stored in the decoded picture buffer 1450. In some embodiments, the decoded picture buffer 1450 is a storage external to the video decoder 1400. In some embodiments, the decoded picture buffer 1450 is a storage internal to the video decoder 1400.

The intra-prediction module 1425 receives intra-prediction data from bitstream 1495 and according to which, produces the predicted pixel data 1413 from the decoded pixel data 1417 stored in the decoded picture buffer 1450. In some embodiments, the decoded pixel data 1417 is also stored in a line buffer (not illustrated) for intra-picture prediction and spatial MV prediction.

In some embodiments, the content of the decoded picture buffer 1450 is used for display. A display device 1455 either retrieves the content of the decoded picture buffer 1450 for display directly, or retrieves the content of the decoded picture buffer to a display buffer. In some embodiments, the display device receives pixel values from the decoded picture buffer 1450 through a pixel transport.

The motion compensation module 1430 produces predicted pixel data 1413 from the decoded pixel data 1417 stored in the decoded picture buffer 1450 according to motion compensation MVs (MC MVs). These motion compensation MVs are decoded by adding the residual motion data received from the bitstream 1495 with predicted MVs received from the MV prediction module 1475.

The MV prediction module 1475 generates the predicted MVs based on reference MVs that were generated for decoding previous video frames, e.g., the motion compensation MVs that were used to perform motion compensation. The MV prediction module 1475 retrieves the reference MVs of previous video frames from the MV buffer 1465. The video decoder 1400 stores the motion compensation MVs generated for decoding the current video frame in the MV buffer 1465 as reference MVs for producing predicted MVs.

The in-loop filter 1445 performs filtering or smoothing operations on the decoded pixel data 1417 to reduce the artifacts of coding, particularly at boundaries of pixel blocks. In some embodiments, the filtering operation performed includes sample adaptive offset (SAO). In some embodiment, the filtering operations include adaptive loop filter (ALF).

Figure 15:
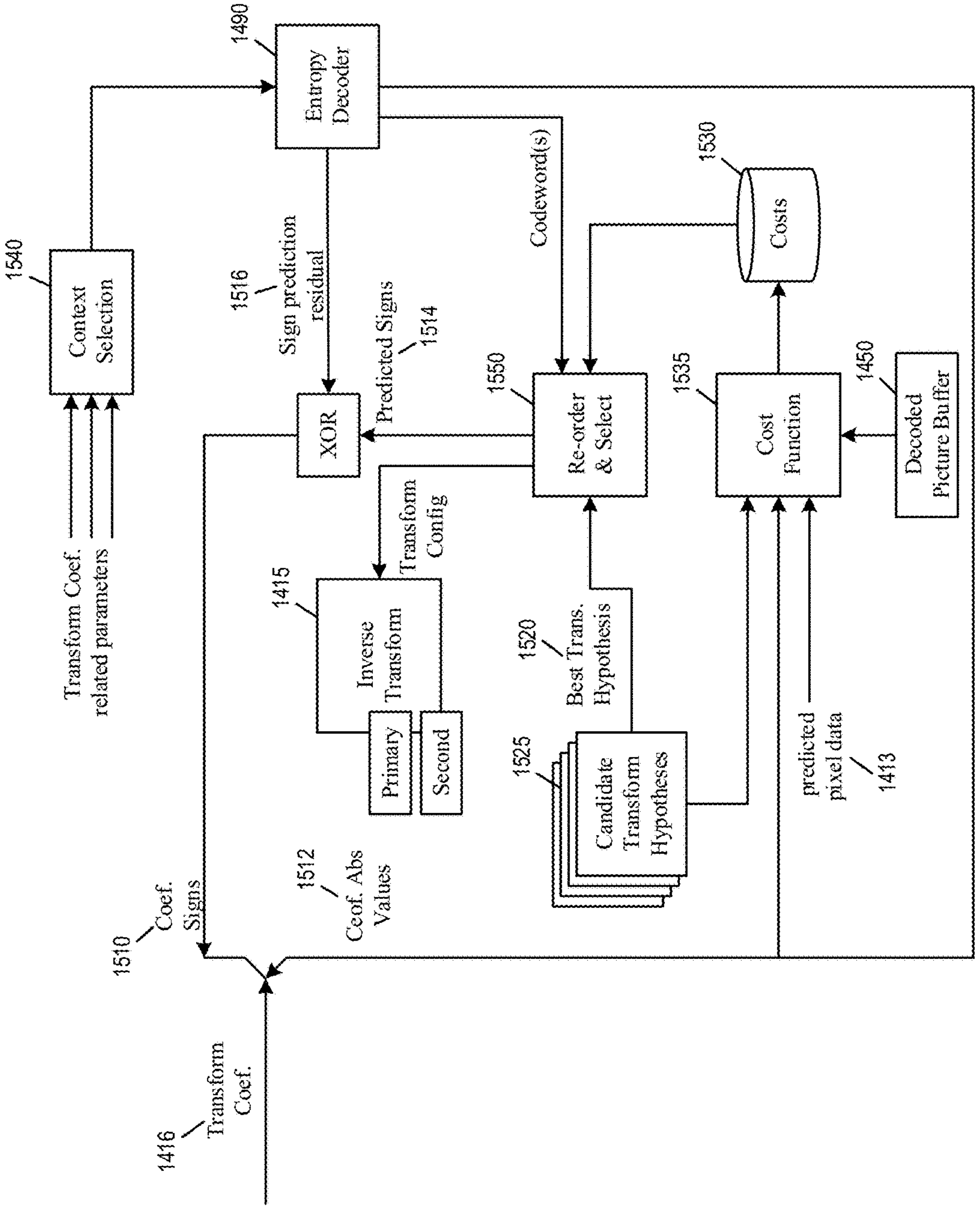
FIG. 15 illustrates portions of the video decoder that implements signaling for transform coding based on boundary matching costs.

FIG. 15 illustrates portions of the video decoder 1400 that implements signaling for transform coding based on boundary matching costs. As illustrated, the transform coefficients 1416 (from the entropy decoder 1490 and the dequantizer 1411) includes coefficient signs 1510 and coefficient absolute values 1512 components. The sign prediction residuals 1516 (or the actual signs) are XOR'ed with predicted signs 1514 to generate coefficient signs 1510. The predicted signs 1514 are provided by a best prediction hypothesis 1520 which is selected from multiple possible candidate transform hypotheses 1525 based on costs 1530. The sign prediction residuals 1516 are provided by the entropy decoder 1490 from an inverse CABAC process.

Each candidate transform hypothesis specifies a predicted transform configuration that includes multiple transform parameters. The multiple transform parameters being jointly predicted by the hypothesis may include two or more of the following transform parameters: (i) a primary transform type, (ii) a secondary transform type, (iii) a transform kernel size, and (iv) a set of coefficient signs.

The costs 1530 are computed by a cost function 1535 for different candidate transform hypotheses 1525. For each candidate transform hypothesis, the cost function 1535 uses (i) pixel values provided by the reconstructed picture buffer 1450, (ii) the absolute values 1512 of transform coefficients, and (iii) the predicted pixel data 1413 to compute a cost. In some embodiments, the cost of a particular transform hypothesis may be computed based on residuals in pixel domain that are inverse transformed from a set of transform coefficients having the set of predicted signs of the sign prediction, and according to the transform parameters of the transform hypothesis (e.g., primary transform type, secondary transform type, transform kernel size, etc.). An example of the cost function is provided by Eqn. (3). An example of the cost calculation operation for a transform hypothesis is described by reference to FIG. 10 above.

A re-reorder and select module 1550 receives the costs 1530 of the various transform hypothesis 1525 as computed by the cost function 1535. The re-reorder and select module 1550 then assigns codewords to the various transform parameters based on the computed costs of the different transform hypotheses 1525. Thus, for example, the shortest codewords may be assigned to primary and secondary transforms that are specified by the best transform hypothesis 1520 (having the lowest cost).

The entropy decoder 1490 may perform an inverse CABAC process to receive signaling of primary transform type, a secondary transform type, transform kernel size, and/or other transform parameters. The signaling may include codewords that are assigned to different transform types and sizes based on computed costs. The entropy decoder 1490 provides the received codewords to the reorder and select module 1550, which maps the codewords to their corresponding transform types and sizes based on the computed costs 1530. These transform types and sizes are provided to the inverse transform module 1415 as a transform configuration, according to which the inverse transform module 1415 performs inverse transform (primary and secondary) on the transform coefficient 1416.

Figure 16:
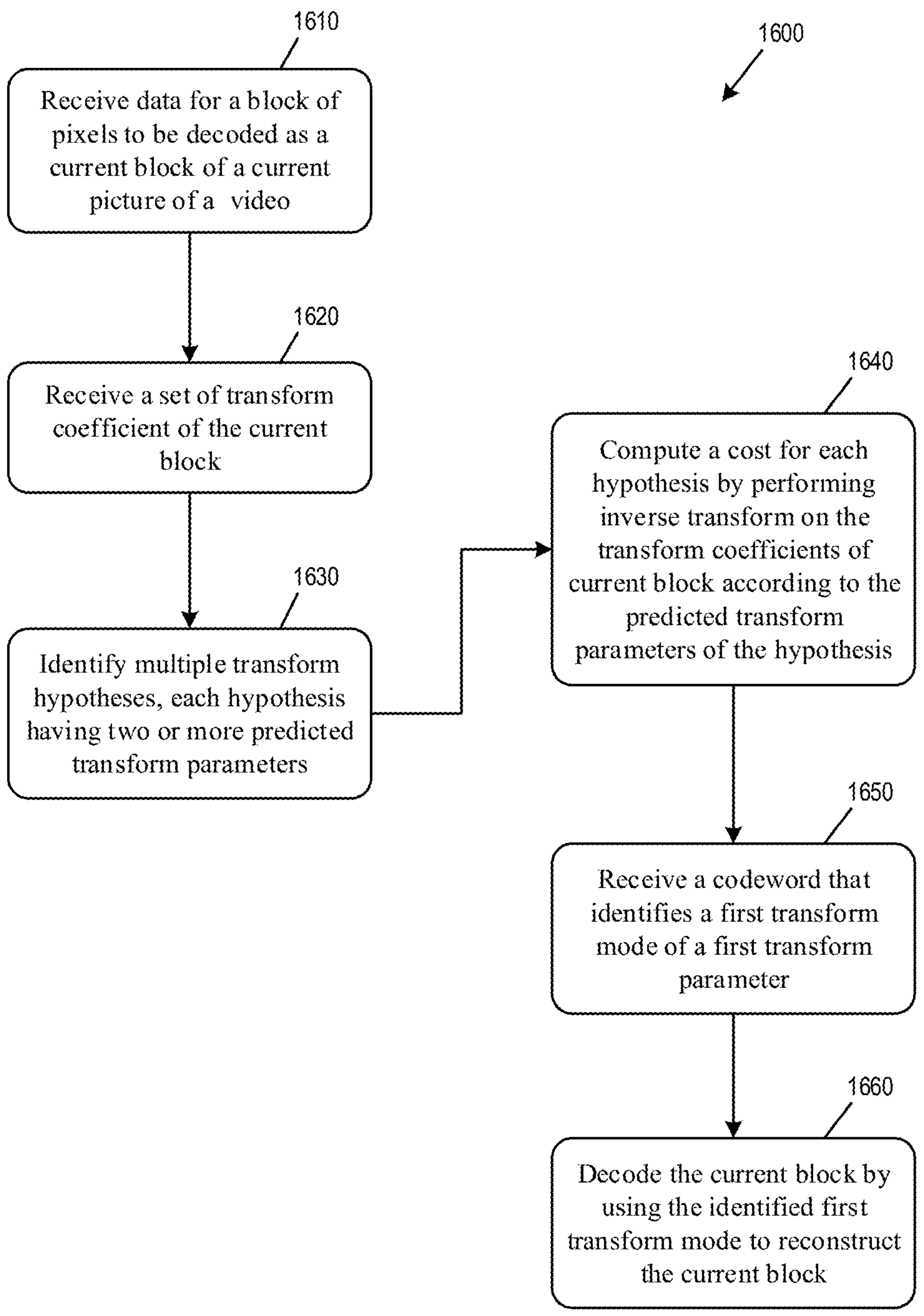
FIG. 16 conceptually illustrates a process for receiving transform coding based on boundary matching costs.

FIG. 16 conceptually illustrates a process 1600 for receiving transform coding based on boundary matching costs. In some embodiments, one or more processing units (e.g., a processor) of a computing device implementing the decoder 1400 performs the process 1600 by executing instructions stored in a computer readable medium. In some embodiments, an electronic apparatus implementing the decoder 1400 performs the process 1600.

The decoder receives (at block 1610) data for a block of pixels to be encoded as a current block of a current picture of a video.

The decoder receives (at block 1620) a set of transform coefficients of the current block. The transform coefficients may be provided by an entropy decoder of the video decoder.

The decoder identifies (at block 1630) multiple transform hypotheses. Each hypothesis has two or more predicted transform parameters. Each transform parameter is selectively configurable as one of multiple transform modes. In some embodiments, the predicted transform parameters of a hypothesis include a primary transform type and a secondary transform type. The predicted transform parameters may also include a transform kernel size. The predicted transform parameters of a hypothesis may include a set of predicted signs for the received transform coefficients and a transform type.

The decoder computes (at block 1640) a cost for each hypothesis by performing inverse transform on the transform coefficients of the current block according to the predicted transform parameters of the hypothesis. The cost for each hypothesis may include a similarity measure that is computed based on samples neighboring the current block and samples of the current block that are reconstructed according to the hypothesis along boundaries of the current block. In some embodiments, the similarity measure is computed based on samples along only one side of the current block. In some embodiments, the similarity measure is computed based on samples that are identified according to an intra prediction direction for the current block. In some embodiments, the cost for each hypothesis is computed by performing inverse transform on only a subset and not all of the transform coefficients of the current block (e.g., only the coefficients in the ROI). In some embodiments, the predicted transform parameters of a hypothesis include predicted signs of only a subset and not all of the transform coefficients of the current block.

The decoder receives (at block 1650) a codeword that identifies a first transform mode of a first transform parameter. The codeword is assigned to the first transform mode based on the calculated costs of the multiple transform hypotheses. The first transform parameter maybe a primary transform type and the identified first transform mode is represented by a Multiple Transform Selection (MTS) index. The first transform parameter may also be a secondary transform type and the identified first transform mode is represented by a non-separable secondary transforms (NSST) index. The decoder may assign codewords to different primary or secondary transform types based on the computed costs, wherein a shortest codeword is assigned to a transform type associated with a lowest cost transform hypothesis.

The decoder decodes (at block 1660) the current block by using the identified first transform mode to reconstruct the current block. Specifically, the current block is reconstructed using inverse transform operations specified based on the first transform mode. The decoder may then provide the reconstructed current block for display as part of the reconstructed current picture.

IX. Example Electronic System

Many of the above-described features and applications are implemented as software processes that are specified as a set of instructions recorded on a computer readable storage medium (also referred to as computer readable medium). When these instructions are executed by one or more computational or processing unit(s) (e.g., one or more processors, cores of processors, or other processing units), they cause the processing unit(s) to perform the actions indicated in the instructions. Examples of computer readable media include, but are not limited to, CD-ROMs, flash drives, random-access memory (RAM) chips, hard drives, erasable programmable read only memories (EPROMs), electrically erasable programmable read-only memories (EEPROMs), etc. The computer readable media does not include carrier waves and electronic signals passing wirelessly or over wired connections.

In this specification, the term "software" is meant to include firmware residing in read-only memory or applications stored in magnetic storage which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the present disclosure. In some embodiments, the software programs, when installed to operate on one or more electronic systems, define one or more specific machine implementations that execute and perform the operations of the software programs.

Figure 17:
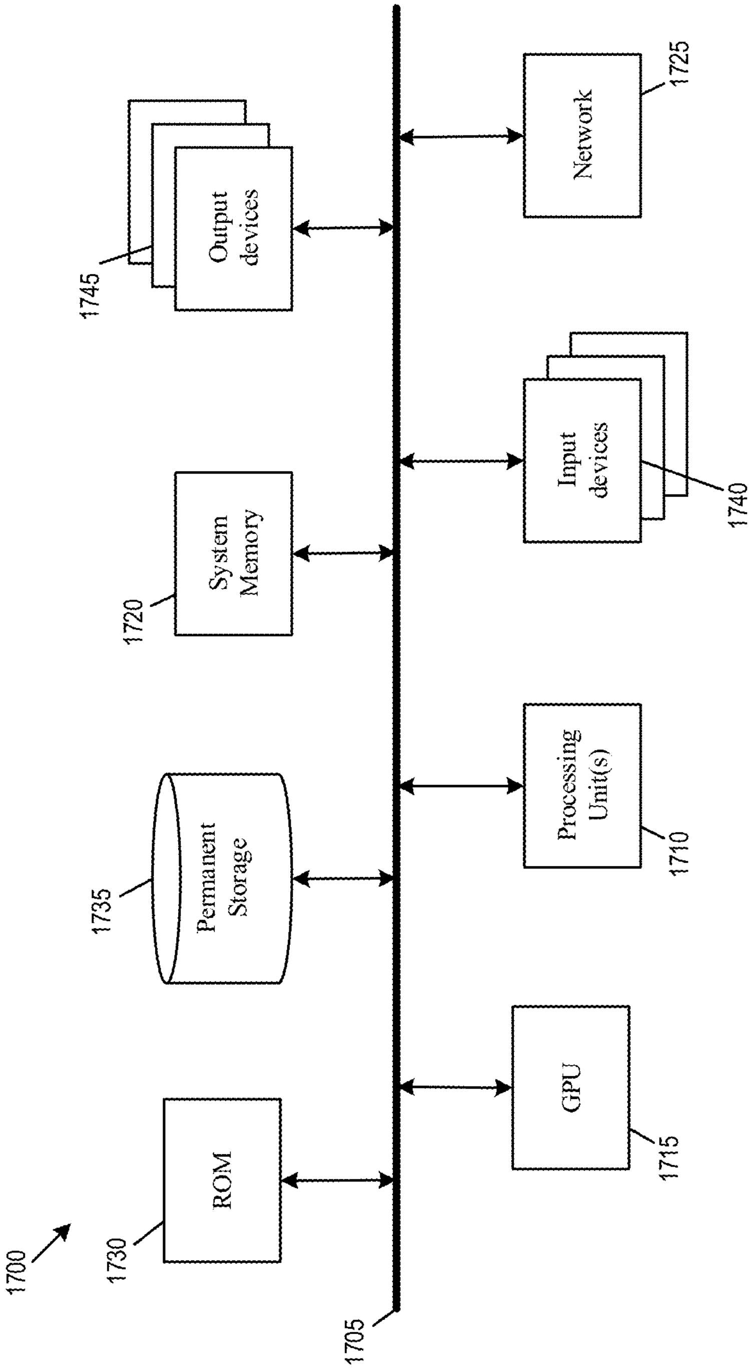
FIG. 17 conceptually illustrates an electronic system with which some embodiments of the present disclosure are implemented.

FIG. 17 conceptually illustrates an electronic system 1700 with which some embodiments of the present disclosure are implemented. The electronic system 1700 may be a computer (e.g., a desktop computer, personal computer, tablet computer, etc.), phone, PDA, or any other sort of electronic device. Such an electronic system includes various types of computer readable media and interfaces for various other types of computer readable media. Electronic system 1700 includes a bus 1705, processing unit(s) 1710, a graphics-processing unit (GPU) 1715, a system memory 1720, a network 1725, a read-only memory 1730, a permanent storage device 1735, input devices 1740, and output devices 1745.

The bus 1705 collectively represents all system, peripheral, and chipset buses that communicatively connect the numerous internal devices of the electronic system 1700. For instance, the bus 1705 communicatively connects the processing unit(s) 1710 with the GPU 1715, the read-only memory 1730, the system memory 1720, and the permanent storage device 1735.

From these various memory units, the processing unit(s) 1710 retrieves instructions to execute and data to process in order to execute the processes of the present disclosure. The processing unit(s) may be a single processor or a multi-core processor in different embodiments. Some instructions are passed to and executed by the GPU 1715. The GPU 1715 can offload various computations or complement the image processing provided by the processing unit(s) 1710.

The read-only-memory (ROM) 1730 stores static data and instructions that are used by the processing unit(s) 1710 and other modules of the electronic system. The permanent storage device 1735, on the other hand, is a read-and-write memory device. This device is a non-volatile memory unit that stores instructions and data even when the electronic system 1700 is off. Some embodiments of the present disclosure use a mass-storage device (such as a magnetic or optical disk and its corresponding disk drive) as the permanent storage device 1735.

Other embodiments use a removable storage device (such as a floppy disk, flash memory device, etc., and its corresponding disk drive) as the permanent storage device. Like the permanent storage device 1735, the system memory 1720 is a read-and-write memory device. However, unlike storage device 1735, the system memory 1720 is a volatile read-and-write memory, such a random access memory. The system memory 1720 stores some of the instructions and data that the processor uses at runtime. In some embodiments, processes in accordance with the present disclosure are stored in the system memory 1720, the permanent storage device 1735, and/or the read-only memory 1730. For example, the various memory units include instructions for processing multimedia clips in accordance with some embodiments. From these various memory units, the processing unit(s) 1710 retrieves instructions to execute and data to process in order to execute the processes of some embodiments.

The bus 1705 also connects to the input and output devices 1740 and 1745. The input devices 1740 enable the user to communicate information and select commands to the electronic system. The input devices 1740 include alphanumeric keyboards and pointing devices (also called "cursor control devices"), cameras (e.g., webcams), microphones or similar devices for receiving voice commands, etc. The output devices 1745 display images generated by the electronic system or otherwise output data. The output devices 1745 include printers and display devices, such as cathode ray tubes (CRT) or liquid crystal displays (LCD), as well as speakers or similar audio output devices. Some embodiments include devices such as a touchscreen that function as both input and output devices.

Finally, as shown in FIG. 17, bus 1705 also couples electronic system 1700 to a network 1725 through a network adapter (not shown). In this manner, the computer can be a part of a network of computers (such as a local area network ("LAN"), a wide area network ("WAN"), or an Intranet, or a network of networks, such as the Internet. Any or all components of electronic system 1700 may be used in conjunction with the present disclosure.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra-density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, many of the above-described features and applications are performed by one or more integrated circuits, such as application specific integrated circuits (ASICs) or field programmable gate arrays (FPGAs). In some embodiments, such integrated circuits execute instructions that are stored on the circuit itself. In addition, some embodiments execute software stored in programmable logic devices (PLDs), ROM, or RAM devices.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

While the present disclosure has been described with reference to numerous specific details, one of ordinary skill in the art will recognize that the present disclosure can be embodied in other specific forms without departing from the spirit of the present disclosure. In addition, a number of the figures (including FIG. 13 and FIG. 16) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the present disclosure is not to be limited by the foregoing illustrative details, but rather is to be defined by the appended claims.

ADDITIONAL NOTES

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A video coding method comprising:

receiving data for a block of pixels to be encoded or decoded as a current block of a current picture of a video;

receiving a set of transform coefficients of the current block;

identifying a plurality of transform hypotheses, wherein each hypothesis comprises one or more predicted parameters corresponding to one or more predicted signs and at least one predicted parameter corresponding to a predicted transform type for the set of transform coefficients of the current block;

computing a cost for each hypothesis by performing inverse transform on the transform coefficients of the current block according to the one or more predicted signs and the predicted transform type of the hypothesis;

determining a first predicted transform type and first predicted signs for the set of transform coefficients of the current block based on the calculated costs of the plurality of transform hypotheses, wherein both the first predicted transform type and the first predicted signs are determined after computing the cost for each hypothesis; and encoding or decoding the current block by reconstructing the current block according to the first transform type and the first predicted signs.

2. The video coding method of claim 1, wherein the predicted transform parameters of a hypothesis further comprise a primary transform type and a secondary transform type.

3. The video coding method of claim 2, wherein the predicted transform parameters further comprise a transform kernel size.

4. The video coding method of claim 1, wherein the predicted signs correspond to the received transform coefficients.

5. The video coding method of claim 1, wherein the cost for each hypothesis comprises a similarity measure that is computed based on samples neighboring the current block and samples of the current block that are reconstructed according to the hypothesis along boundaries of the current block.

6. The video coding method of claim 5, wherein the similarity measure is computed based on samples along only one side of the current block.

7. The video coding method of claim 5, wherein the similarity measure is computed based on samples that are identified according to an intra prediction direction for the current block.

8. The video coding method of claim 5, wherein the similarity measure is computed based on samples that are down-sampled.

9. The video coding method of claim 1, wherein the cost for each hypothesis is computed by performing inverse transform on only a subset and not all of the transform coefficients of the current block.

10. The video coding method of claim 1, wherein the predicted transform parameters of a hypothesis comprise predicted signs of only a subset and not all of the transform coefficients of the current block.

11. The video coding method of claim 1, further comprising assigning codewords to different primary or secondary transform types based on the computed costs, wherein a shortest codeword is assigned to a transform type associated with a lowest cost transform hypothesis.

12. An electronic apparatus comprising:

a video coding circuit configured to perform operations comprising:

receiving data for a block of pixels to be encoded or decoded as a current block of a current picture of a video;

receiving a set of transform coefficients of the current block;

identifying a plurality of transform hypotheses, wherein each hypothesis comprises one or more predicted parameters corresponding to one or more predicted signs and at least one predicted parameter corresponding to a predicted transform type for the set of transform coefficients of the current block;

computing a cost for each hypothesis by performing inverse transform on the transform coefficients of the current block according to the one or more predicted signs and the predicted transform type of the hypothesis;

determining a first predicted transform type and first predicted signs for the set of transform coefficients of the current block based on the calculated costs of the plurality of transform hypotheses, wherein both the first predicted transform type and the first predicted signs are determined after computing the cost for each hypothesis; and encoding or decoding the current block by reconstructing the current block according to the first transform type and the first predicted signs.

13. A video decoding method comprising:

receiving data for a block of pixels to be decoded as a current block of a current picture of a video;

receiving a set of transform coefficients of the current block;

identifying a plurality of transform hypotheses, wherein each hypothesis comprises one or more predicted parameters corresponding to one or more predicted signs and at least one predicted parameter corresponding to a predicted transform type for the set of transform coefficients of the current block;

computing a cost for each hypothesis by performing inverse transform on the transform coefficients of the current block according to the one or more predicted signs and the predicted transform type of the hypothesis;

determining a first predicted transform type and first predicted signs for the set of transform coefficients of the current block based on the calculated costs of the plurality of transform hypotheses, wherein both the first predicted transform type and the first predicted signs are determined after computing the cost for each hypothesis; and decoding the current block by reconstructing the current block according to the first transform type and the first predicted signs.

* * * * *